United States Patent
Stenfort

(10) Patent No.: US 10,379,595 B2
(45) Date of Patent: Aug. 13, 2019

(54) DEVICE POWER CONTROL

(71) Applicant: Seagate Technology LLC, Cupertino, CA (US)

(72) Inventor: Ross John Stenfort, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 490 days.

(21) Appl. No.: 14/854,005

(22) Filed: Sep. 14, 2015

(65) Prior Publication Data

US 2016/0004294 A1 Jan. 7, 2016

Related U.S. Application Data

(63) Continuation of application No. PCT/IB2014/059744, filed on Mar. 13, 2014.

(60) Provisional application No. 61/786,110, filed on Mar. 14, 2013.

(51) Int. Cl.
| | |
|---|---|
| *G06F 1/24* | (2006.01) |
| *G06F 1/26* | (2006.01) |
| *G06F 3/06* | (2006.01) |
| *G06F 1/3234* | (2019.01) |
| *G06F 1/3287* | (2019.01) |

(52) U.S. Cl.
CPC .............. *G06F 1/3287* (2013.01); *G06F 1/24* (2013.01); *G06F 1/266* (2013.01); *G06F 1/3268* (2013.01); *G06F 1/3275* (2013.01); *G06F 3/0625* (2013.01); *G06F 3/0659* (2013.01); *G06F 3/0688* (2013.01); *Y02D 10/14* (2018.01); *Y02D 10/154* (2018.01)

(58) Field of Classification Search
CPC ..................................................... G06F 3/0625
See application file for complete search history.

(56) References Cited

U.S. PATENT DOCUMENTS

| | | | |
|---|---|---|---|
| 2003/0070103 A1 | 4/2003 | Kim | |
| 2008/0005398 A1* | 1/2008 | Huffman | G06F 3/0611 710/39 |
| 2008/0184051 A1* | 7/2008 | Cheong | G06F 13/4291 713/323 |
| 2010/0286841 A1 | 11/2010 | Subbloie | |
| 2011/0131427 A1* | 6/2011 | Jorgenson | G06F 1/26 713/300 |
| 2012/0072664 A1 | 3/2012 | Higaki et al. | |
| 2012/0173903 A1 | 7/2012 | Huffman et al. | |

(Continued)

OTHER PUBLICATIONS

Stenfort, Ross John; International Search Report and Written Opinion for PCT Application No. PCT/IB2014/059744, filed Mar. 13, 2014, dated Aug. 21, 2014, 14 pgs.

(Continued)

*Primary Examiner* — Kim Huynh
*Assistant Examiner* — Joshua Neveln
(74) *Attorney, Agent, or Firm* — Taylor English Duma LLP

(57) ABSTRACT

In various embodiments and/or usage scenarios, device power control, such as relating to one or more power control commands, requests to transition operation to a specific power mode, and/or device power management commands, is advantageous and improves one or more of: performance, reliability, unit cost, and development cost of one or more devices, such as storage devices (e.g. a Solid-State Disk (SSD)) or systems including same.

18 Claims, 7 Drawing Sheets

(56) References Cited

U.S. PATENT DOCUMENTS

2012/0226927 A1  9/2012  Kagan
2013/0097437 A9* 4/2013  Naveh .................. G06F 1/3203
                                                    713/320

OTHER PUBLICATIONS

Stenfort, Ross John; PCT Application entitled: Device Power Control having serial No. PCT/IB2014/059744, filed Mar. 13, 2014, 97 pgs.

* cited by examiner

DEVICE POWER CONTROL

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all commonly owned with the instant application at the time the invention was made:

This application is a continuation of International Application No. PCT/IB2014/059744, filed Mar. 13, 2014, which claims the benefit of U.S. Provisional Application No. 61/786,110, filed Mar. 14, 2013.

BACKGROUND

Field

Advancements in storage device technology and manufacturing are needed to provide improvements in cost, profitability, performance, efficiency, and utility of use.

Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

SYNOPSIS

The invention may be implemented in numerous ways, e.g., as a process, an article of manufacture, an apparatus, a system, a composition of matter, and a computer readable medium such as a computer readable storage medium (e.g., media in an optical and/or magnetic mass storage device such as a disk, an integrated circuit having non-volatile storage such as flash storage), or a computer network wherein program instructions are sent over optical or electronic communication links. The Detailed Description provides an exposition of one or more embodiments of the invention that enable improvements in cost, profitability, performance, efficiency, and utility of use in the field identified above. The Detailed Description includes an Introduction to facilitate understanding of the remainder of the Detailed Description. The Introduction includes Example Embodiments of one or more of systems, methods, articles of manufacture, and computer readable media in accordance with concepts described herein. As is discussed in more detail in the Conclusions, the invention encompasses all possible modifications and variations within the scope of the issued claims.

LIST OF REFERENCE SYMBOLS IN DRAWINGS

Figure 1A:
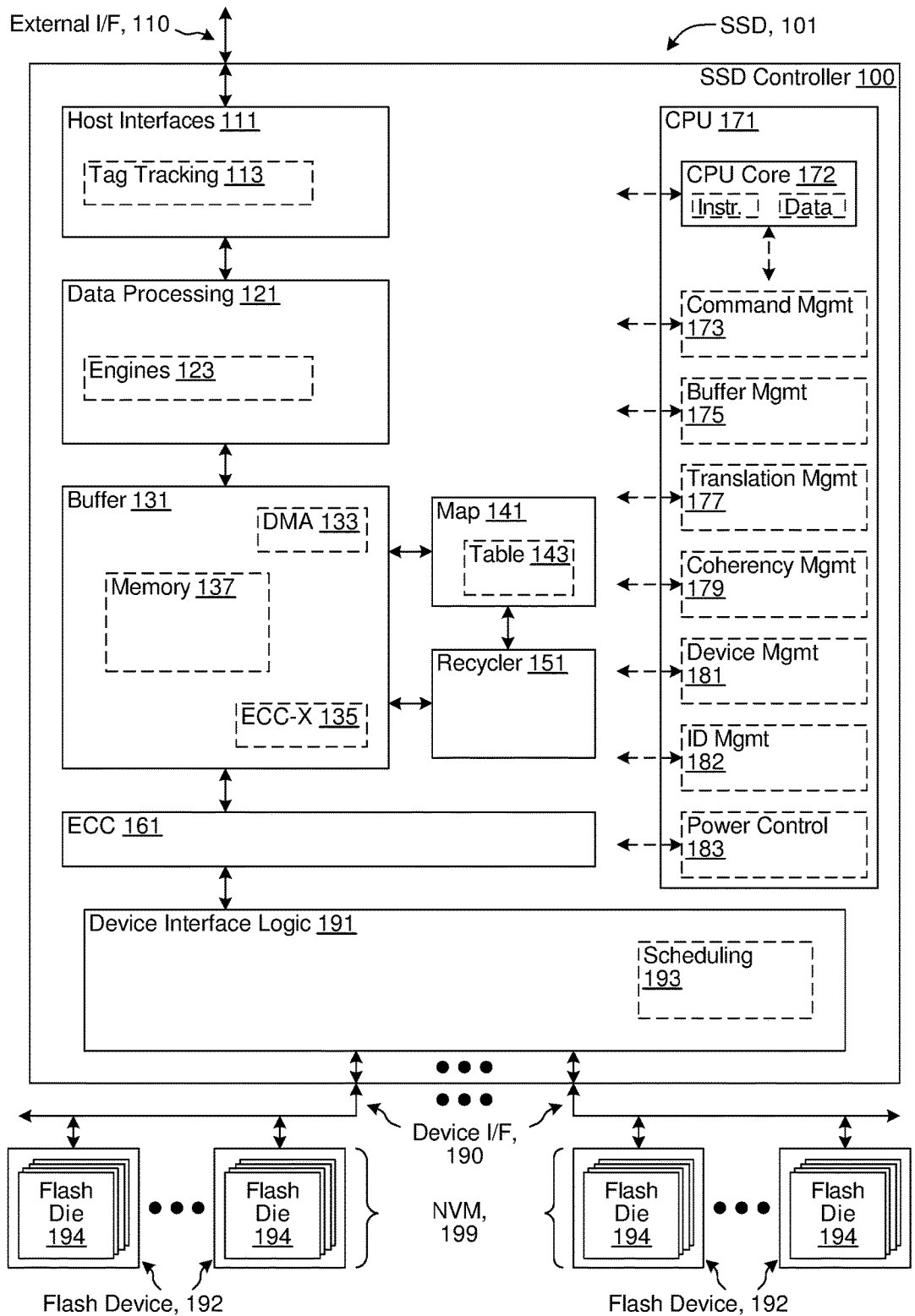
FIG. 1A illustrates selected details of an embodiment of a Solid-State Disk (SSD) including an SSD controller enabled to perform device power control.

| Ref. Symbol | Element Name |
| --- | --- |
| 100 | SSD Controller |
| 101 | SSD |
| 102 | Host |
| 103 | (optional) Switch/Fabric/Intermediate Controller |
| 104 | Intermediate Interfaces |
| 105 | OS |
| 106 | FirmWare (FW) |
| 107 | Driver |
| 107D | dotted-arrow (Host Software ←→ I/O Devise Communication) |
| 108 | Power Control Software |
| 109 | Application |
| 109D | dotted-arrow (Application ←→ I/O Device Communication via driver) |
| 109V | dotted-arrow (Application ←→ I/O Device Communication via VF) |
| 110 | External Interfaces |
| 111 | Host Interfaces |
| 112C | (optional) Card Memory |
| 113 | Tag Tracking |
| 114 | Multi-Device Management Software |
| 115 | Host Software |
| 116 | I/O Card |
| 117 | I/O & Storage Devices/Resources |
| 118 | Servers |
| 119 | LAN/WAN |
| 121 | Data Processing |
| 123 | Engines |
| 131 | Buffer |
| 133 | DMA |
| 135 | ECC-X |
| 137 | Memory |
| 141 | Map |
| 143 | Table |
| 151 | Recycler |
| 161 | ECC |
| 171 | CPU |
| 172 | CPU Core |
| 173 | Command Management |
| 175 | Buffer Management |
| 177 | Translation Management |
| 179 | Coherency Management |
| 180 | Memory Interface |
| 181 | Device Management |
| 182 | Identity Management |
| 183 | Power Control |
| 190 | Device Interfaces |
| 191 | Device Interface Logic |
| 192 | Flash Device |
| 193 | Scheduling |
| 194 | Flash Die |
| 196 | Saved Power Mode |
| 199 | NVM |
| 200D | Device Actions |
| 200H | Host Actions |
| 201H | Start |
| 202H | Issue (other than) Power Control Command |
| 203D | Receive Power Control Command |
| 203H | Issue Power Control Command |

-continued

| Ref. Symbol | Element Name |
|---|---|
| 204D | Process Power Control Command |
| 212D | Receive (other than) Power Control Command |
| 213D | Process (other than) Power Control Command |
| 214D | Process (other than) Power Control Command |
| 215D | Process (other than) Power Control Command |
| 216D | Process (other than) Power Control Command |
| 299D | End |
| 301 | Start |
| 302 | Install FW |
| 302U | PowerUp/Reset |
| 303 | Initialize |
| 304 | Operate |
| 304P | Power Control Command |
| 304U | PowerUp/Reset |
| 305 | Persistent? |
| 305N | No |
| 305Y | Yes |
| 306 | Change Saved |
| 307 | Change Operating |
| 312 | SavedPowerMode <= ManufacturingPowerMode |
| 313 | OperatingPowerMode <= SavedPowerMode |
| 316 | SavedPowerMode <= NewPowerMode |
| 317 | OperatingPowerMode <= NewPowerMode |
| 400D | Device Actions |
| 400H | Host Actions |
| 401H | Start |
| 402D | Receive Power Control Command (Info Collection) |
| 402H | Issue Power Control Command (Info Collection) |
| 403D | Conditionally Distribute |
| 404D | Collect Results |
| 404H | Determine Revised Power Plan |
| 405D | Receive Power Control Command (Change) |
| 405H | Issue Power Control Command (Change) |
| 406D | Conditionally Distribute |
| 407D | Perform |
| 413D | (To) Other Devices |
| 414D | (From) Other Devices |
| 416D | (To) Other Devices |
| 499D | End |
| 501 | PowerUp/Reset |
| 502 | Initialize PHY Power Mode |
| 503 | Operate PHY |
| 503R | Transition Request |
| 504 | Examine Device Power State |
| 505 | Use Provided? |
| 505N | No |
| 505Y | Yes |
| 506 | Determine New PHY Power Mode |
| 507 | Set PHY Power Mode |
| 600D | Device Actions |
| 600H | Host Actions |
| 601H | Start |
| 602D | Execute Software |
| 602U | User Input (optional) |
| 603D | Receive & Process Power Control Command |
| 603H | Issue Power Control Command (Modify Map) |
| 604D | Device Power Management Command Map |
| 605D | Receive & Process Device Power Management Command |
| 605H | Issue Device Power Management Command |
| 699D | End |

DETAILED DESCRIPTION

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (such as: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is nor unnecessarily obscured.

INTRODUCTION

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Acronyms

At least some of the various shorthand abbreviations (e.g. acronyms) defined here refer to certain elements used herein.

| Acronym | Description |
|---|---|
| AHCI | Advanced Host Controller Interface |
| API | Application Program Interface |
| ATA | Advanced Technology Attachment (AT Attachment) |
| BCH | Bose Chaudhuri Hocquenghem |
| BIOS | Basic Input/Output System |
| CD | Compact Disk |
| CF | Compact Flash |
| CPU | Central Processing Unit |
| CRC | Cyclic Redundancy Check |
| DAS | Direct Attached Storage |
| DDR | Double-Data-Rate |
| DLL | Delay Locked Loop |
| DMA | Direct Memory Access |
| DNA | Direct NAND Access |
| DRAM | Dynamic Random Access Memory |
| DVD | Digital Versatile/Video Disk |
| DVR | Digital Video Recorder |
| ECC | Error-Correcting Code |
| eMMC | Embedded MultiMediaCard |
| eSATA | external Serial Advanced Technology Attachment |
| GPS | Global Positioning System |
| HDD | Hard Disk Drive |
| I/O | Input/Output |
| IC | Integrated Circuit |
| IDE | Integrated Drive Electronics |
| LAN | Local Area Network |
| LBA | Logical Block Address |
| LDPC | Low-Density Parity-Check |

| Acronym | Description |
| --- | --- |
| MLC | Multi-Level Cell |
| MMC | MultiMediaCard |
| NAS | Network Attached Storage |
| NCQ | Native Command Queuing |
| NVM | Non-Volatile Memory |
| ONA | Optimized NAND Access |
| ONFI | Open NAND Flash Interface |
| OS | Operating System |
| PC | Personal Computer |
| PCIe | Peripheral Component Interconnect express (PCI express) |
| PDA | Personal Digital Assistant |
| PHY | PHYsical interface |
| PLL | Phase Locked Loop |
| POS | Point Of Sale |
| RAID | Redundant Array of Inexpensive/Independent Disks |
| RASIE | Redundant Array of Silicon Independent Elements |
| ReRAM | Resistive Random Access Memory |
| RS | Reed-Solomon |
| SAN | Storage Attached Network |
| SAS | Serial Attached Small Computer System Interface (Serial Attached SCSI) |
| SATA | Serial Advanced Technology Attachment (Serial ATA) |
| SCSI | Small Computer System Interface |
| SD | Secure Digital |
| SDR | Single-Data-Rate |
| SLC | Single-Level Cell |
| SMART | Self-Monitoring Analysis and Reporting Technology |
| SSD | Solid-State Disk/Drive |
| SSP | Serial Small Computer System Interface Protocol (Serial SCSI Protocol) |
| UFS | Unified Flash Storage |
| USB | Universal Serial Bus |
| VF | Virtual Function |
| WAN | Wide Area Network |

In various embodiments and/or usage scenarios, device power control, such as via one or more power control commands, is advantageous and improves one or more of: performance, reliability, unit cost, and development cost of one or more devices, such as storage devices (e.g. an SSD) or systems including same. In a first aspect, a queued power control command is issued from a source agent (e.g. a host such as a computer) to a sink agent (e.g. a storage device such as an SSD). The queued characteristic of the queued power control command enables processing without completing and/or aborting commands previously issued to the sink agent and not yet completed or aborted. For example, the queued power control command is processed immediately upon receipt, and/or independently of previously received but not yet completed or aborted commands.

In a second aspect, an optionally persistent power control command is issued from a host to a device. If persistent, then effects of the optionally persistent power control command remain in effect until a next power control command (e.g. across one or more power up and/or reset events). If not persistent, then effects of the optionally persistent power control command cease upon a next power up event, a next reset event, and/or a next power control command. In some embodiments and/or usage scenarios, a persistent power control command enables subsequent device boots (e.g. in response to a power up and/or reset event) according to a revised power budget, such as not exceeding a new power dissipation maximum.

In a third aspect, a host issues to a device a power control command to obtain power information from the device, and selectively any devices coupled to the device. The device distributes the power-information-obtaining power control command to the coupled devices (if any), and collects resulting information from the coupled devices and itself. The device returns the collected information to the host. The host, based at least in part on the returned collected information, determines a new power operating point and selectively issues a power control command to change power to the device (as well as the coupled devices, if any). The device then distributes the power-changing power control command to the coupled devices as appropriate and processes the command itself.

In a fourth aspect, an interface (e.g. a PHY interface of a device or a host) is selectively and/or conditionally operable in a compatible mode and an enhanced mode. While operating in the compatible mode, the interface is fully compliant with at least one storage interface standard. While operating in the enhanced mode, the interface is compliant with the at least one storage interface standard except with regards to processing requests to transition to a specific power mode. The requests are processed conditionally and/or selectively dependent on a power state of the device, and a request to transition to a particular power mode conditionally and/or selectively results in operation in the particular mode or another power mode that is different than the particular power mode.

In a fifth aspect, a device is enabled to consult a device power management command map to determine which of a plurality of operating power states to operate in accordance with in response to reception of a device power management command. A host runs software (optionally with user input) to send a power control command that specifies one or more modifications to the device power management command map. Subsequently received device power management commands are interpreted in accordance with the modifications. Thus mapping between device power management commands and operating power states of the device is selectively and/or dynamically maintained.

An example of a command is a directive to perform one or more operations. A source agent provides a command to one or more sink agents. Exemplary source/sink agents include initiator/target, master/slave, and host/device. E.g. a host computer operating as a SCSI/iSCSI/SATA/SAS initiator is a command source agent that provides commands to a storage device operating as a SCSI/SCSI/SATA/SAS target that receives the commands and in response performs operations in accordance with the commands. Exemplary commands include read, write, power control, and device power management commands. A command optionally includes one or more parameters, e.g. an LBA, a persistence and/or timeline indicator, a maximum power level, an average power level, a power change fraction, percentage, or amount, a device power management to device operating power state mapping, and any combination of any one or more of the foregoing.

Examples of a source agent include a computer (e.g. a workstation computer, a server computer, a PC, a laptop computer, a notebook computer, a netbook computer, a tablet device or computer, an ultrabook computer, and an automotive media computer). Further examples of a source agent include a server (e.g. a storage server) and a storage sub-system (e.g. a SAN, a NAS device, a DAS device, and a storage appliance). Further examples of a source agent include a consumer electronics element (e.g. an electronic reading device (such as an c-reader), a PDA, a navigation system, a GPS device (such as a handheld GPS device), a media player, a television, a media recorder, a DVR, a digital camera, a cellular handset, a cordless telephone handset, and an electronic game.). Further examples of a source agent include various automotive electronic systems (e.g. an automotive control system such as an automotive media control system). Further examples of a source agent include various business electronic systems (e.g. a printer, copier or fax machine or all-in-one device, a POS device and/or terminal, and a cash-register).

Examples of a sink agent include various I/O agents and/or devices, such as storage devices (e.g. an optical storage device, a magnetic storage device, a mechanical storage device, and a solid-state storage device) and storage electronics (e.g. a disk drive, a magnetic disk drive, a solid-state disk drive, a solid-state disk drive having one or more flash memories, and a tape drive). Further examples of a sink agent include various devices compatible with various interface standards, such as various storage devices compatible with various storage interface standards (e.g. a USB interface standard, a CF interface standard, an MMC interface standard, an eMMC interface standard, a Thunderbolt interface standard, a UFS interface standard, an SD interface standard, a Memory Stick interface standard, an xD-picture card interface standard, an IDE interface standard, a SATA interface standard, an eSATA interface standard, a SCSI interface standard, a SAS interface standard, a Fibre Channel interface standard, an Ethernet interface standard, and a PCIe interface standard).

An example of sending a command (e.g. from a sink agent to a source agent) is communication (directly or indirectly) via any one or more interfaces, such as interfaces compatible with the aforementioned storage interface standards. Commands are communicated variously via any combination of programmed I/O, memory accesses. DMA, and so forth, e.g., via direct communication of commands, pointers to work lists of commands in memory, or any combination thereof.

Commands are optionally queued or optionally not queued, individually and/or according to specific command, command parameter, and/or operating context. An example of a queued command is a read command that is performed in no particular order with respect to other queued (e.g. read) commands. An exemplary queuing operating context is SATA NCQ. Another example of a queued command is a power control command that is explicitly marked as queued and/or understood by source and sink agents to be interpreted as a queued command. In some embodiments and/or usage scenarios, queued commands are performed by sink agents in any convenient order. For example, in a particular SATA NCQ operating environment, a SATA device performs read and write commands in an order determined by location of physical media sectors relating to the commands and performs power control commands as immediately as practical.

In some embodiments and/or usage scenarios, a queued command is placed on a queue with other previously received but as yet unprocessed queued commands, and then acted on by an order determined by the sink agent. An exemplary order is determined, e.g., to improve performance, such as bandwidth, latency, and/or power consumption.

In some embodiments and/or usage scenarios, queued power control commands are performed at a time that is independent of liming of other queued commands, such as queued commands that are queued and/or previously begun at a time that a power control command is beginning processing, undergoing processing, or completing processing. Thus in some embodiments and/or usage scenarios, a queued power control command is processed before a queued command that is not a power control command, even when the queued power control command is sent or received after the queued command that is not a power control command.

Various example embodiments of power control commands include vendor-specific commands, non-standard commands, and standard commands augmented with one or more non-standard parameters.

Examples of parallel storage interfaces are ATA, such as used by an IDE storage device (e.g. drive), and (parallel) SCSI. Examples of serial storage interfaces are SATA and SAS. Some serial storage interfaces implement commands that are compatible with comparable parallel storage interface commands, e.g. some SATA commands are compatible with some ATA commands, and some SAS commands are compatible with some SCSI commands.

In some embodiments having one or more sink agents that implement storage via non-volatile memory, example interfaces to the mm-volatile memory (e.g. flash memory) include interfaces that am compatible with one or more of an ONFI interface, a Toggle-mode interface, a DDR synchronous interface, a DDR2 synchronous interface, a synchronous interface, and an asynchronous interface.

EXAMPLE EMBODIMENTS

In concluding the introduction to the detailed description, what follows is a collection of example embodiments, including at least some explicitly enumerated as "ECs" (Example Combinations), providing additional description of a variety of embodiment types in accordance with the concepts descried herein; these examples are not meant to be mutually exclusive, exhaustive, or restrictive; and the invention is not limited to these example embodiments but rather encompasses all possible modifications and variations within the scope of the issued claims and their equivalents.

EC1) A method comprising:
receiving a first command and then a second command;
processing the second command in response to the receiving;
wherein the receiving and the processing are in a storage device;
wherein the second command comprises power control information; and
wherein the processing commences while the first command is outstanding.

EC2) The method of EC1, wherein the receiving is via an interface of the storage device that is compatible with at least one storage interface standard.

EC3) The method of EC1, further comprising processing the first command in accordance with the power control information.

EC4) The method of EC1, further comprising the storage device powering-up in accordance with at least a portion of the power control information.

EC5) The method of EC4, wherein the portion of the power control information is different than corresponding power control information that is in accordance with manufacturing of the storage device.

EC6) The method of EC1, further comprising the storage device resetting in accordance with at least a portion of the power control information.

EC7) The method of EC1, further comprising operating the storage device in accordance with at least a portion of the power control information across a reset and/or a power cycle of the storage device.

EC8) The method of EC1, further comprising the storage device passing along at least a portion of the power control information to at least one other storage device.

EC9) The method of EC8, further comprising the storage device receiving power usage information from the at least one other storage device.

EC10) The method of EC9, wherein a host provides the first and the second commands, and further comprising the storage device passing along at least a portion of the power usage information to the host.

EC11) The method of EC1, wherein the storage device comprises non-volatile memory, and the processing comprises altering what portion of the non-volatile memory is maximally enabled to be concurrently active.

EC12) The method of EC11, wherein the non-volatile memory comprises one or more flash memory devices, and the altering comprises altering how many of the flash memory devices are maximally enabled to be concurrently active.

EC13) The method of EC12, wherein the altering how many of the flash memory devices are maximally enabled to be concurrently active comprises accessing predetermined flash memory device power consumption information based at least in part on at least a portion of the power control information.

EC14) The method of EC12, further comprising measuring power consumption of at least some of the flash memory devices, and wherein the altering how many of the flash memory devices are maximally enabled to be concurrently active comprises accessing at least a portion of the measured power consumption based at least in part on at least a portion of the power control information.

EC15) The method of EC1, wherein the storage device comprises one or more interfaces to non-volatile memory, and the processing comprises altering what portion of the interfaces are maximally enabled to be concurrently active.

EC16) The method of EC1, wherein the storage device comprises a reference frequency generator, and the processing comprises altering a frequency that the reference frequency generator generates.

EC17) The method of EC1, wherein the processing comprises modifying mapping information that enables mapping device power management commands to corresponding operating power states of the storage device, the modifying being based at least in part on information provided by the second command, and further comprising:
  in the storage device, receiving an instance of a particular one of the device power management commands, and in response accessing the mapping information to determine a particular one of the operating power states, the accessing being based at least in part on the instance; and
  in the storage device, in response to the accessing, operating the storage device in accordance with the particular operating power state.

EC18) A system comprising:
  means for receiving a first command and then a second command;
  means for processing the second command in response to the means for receiving;
  wherein a storage device comprises the means for receiving and the means for processing;
  wherein the second command comprises power control information; and
  wherein the means for processing commences processing the second command while the first command is outstanding.

EC19) The system of EC18, wherein the means for receiving comprises an interface of the storage device that is comparable with at least one storage interface standard.

EC20) The system of EC18, further comprising means for processing the first command in accordance with the power control information.

EC21) The system of EC18, wherein the storage device is enabled to power-up in accordance with at least a portion of the power control information.

EC22) The system of EC21, wherein the portion of the power control information is different than corresponding power control information that is in accordance with manufacturing of the storage device.

EC23) The system of EC18, further comprising means for the storage device to reset in accordance with at least a portion of the power control information.

EC24) The system of EC18, further comprising means for operating the storage device in accordance with at least a portion of the power control information across a reset and/or a power cycle of the storage device.

EC25) The system of EC18, further comprising means for the storage device to pass along at least a portion of the power control information to at least one other storage device.

EC26) The system of EC25, further comprising means for the storage device to receive power usage information from the at least one other storage device.

EC27) The system of EC26, wherein a host provides the first and the second commands, and further comprising means for the storage device to pass along at least a portion of the power usage information to the host.

EC28) The system of EC18, wherein the storage device comprises non-volatile memory, and the means for processing comprises means for altering what portion of the non-volatile memory is maximally enabled to be concurrently active.

EC29) The system of EC28, wherein the non-volatile memory comprises one or more flash memory devices, and the means for altering comprises means for altering how many of the flash memory devices are maximally enabled to be concurrently active.

EC30) The system of EC29, wherein the means for altering how many of the flash memory devices are maximally enabled to be concurrently active comprises means for accessing predetermined flash memory device power consumption information based at least in part on at least a portion of the power control information.

EC31) The system of EC29, further comprising means for measuring power consumption of at least some of the flash memory devices, and wherein the means for altering how many of the flash memory devices are maximally enabled to be concurrently active comprises means for accessing at least a portion of the measured power consumption based at least in part on at least a portion of the power control information.

EC32) The system of EC18, wherein the storage device comprises one or more interfaces to non-volatile memory, and the means for processing comprises means for altering what portion of the interfaces are maximally enabled to be concurrently active.

EC33) The system of EC18, wherein the storage device comprises a reference frequency generator, and the means for processing comprises means for altering a frequency that the reference frequency generator generates.

EC34) The system of EC18, wherein the means for processing comprises means for modifying mapping information that enables mapping device power management commands to corresponding operating power states of the storage device, the modifying being based at least in part on information provided by the second command, and further comprising:

means for receiving, in the storage device, an instance of a particular one of the device power management commands, and in response accessing the mapping information to determine a particular one of the operating power states, the accessing being based at least in part on the instance; and means for, in response to the accessing, operating the storage device in accordance with the particular operating power state.

EC35) A non-transitory tangible compute readable medium having a set of instructions stored therein that when executed by a processing element cause the processing element to perform and/or control operations comprising:

receiving a first command and then a second command;
processing the second command in response to the receiving;
wherein the receiving and the processing are in a storage device;
wherein the second command comprises power control information; and
wherein the processing commences while the first command is outstanding.

EC36) The non-transitory tangible computer readable medium of EC35, wherein the receiving is via an interface of the storage device that is compatible with at least one storage interface standard.

EC37) The non-transitory tangible computer readable medium of EC35, wherein the operations further comprise processing the first command in accordance with the power control information.

EC38) The non-transitory tangible computer readable medium of EC35, wherein the operations further comprise the storage device powering-up in accordance with at least a portion of the power control information.

EC39) The non-transitory tangible computer readable medium of EC38, wherein the portion of the power control information is different than corresponding power control information that is in accordance with manufacturing of the storage device.

EC40) The non-transitory tangible computer readable medium of EC35, wherein the operations further comprise the storage device resetting in accordance with at least a portion of the power control information.

EC41) The non-transitory tangible computer readable medium of EC35, wherein the operations further comprise operating the storage device in accordance with at least a portion of the power control information across a reset and/or a power cycle of the storage device.

EC42) The non-transitory tangible computer readable medium of EC35, wherein the operations further comprise the storage device passing along at least a portion of the power control information to at least one other storage device.

EC43) The non-transitory tangible computer readable medium of EC42, wherein the operations further comprise the storage device receiving power usage information from the at least one other storage device.

EC44) The non-transitory tangible computer readable medium of EC43, wherein a host provides the first and the second commands, and the operations further comprise the storage device passing along at least a portion of the power usage information to the host.

EC45) The non-transitory tangible computer readable medium of EC35, wherein the storage device comprises non-volatile memory, and the processing comprises altering what portion of the non-volatile memory is maximally enabled to be concurrently active.

EC46) The non-transitory tangible computer readable medium of EC45, wherein the non-volatile memory comprises one or more flash memory devices, and the altering comprises altering how many of the flash memory devices are maximally enabled to be concurrently active.

EC47) The non-transitory tangible computer readable medium of EC46, wherein the altering how many of the flash memory devices are maximally enabled to be concurrently active comprises accessing predetermined flash memory device power consumption information based at least in pan on at least a portion of the power control information.

EC48) The non-transitory tangible computer readable medium of EC46, wherein the operations further comprise measuring power consumption of at least some of the flash memory devices, and the altering how many of the flash memory devices are maximally enabled to be concurrently active comprises accessing at least a portion of the measured power consumption based at least in part on at least a portion of the power control information.

EC49) The non-transitory tangible computer readable medium of EC35, wherein the storage device comprises one or more interfaces to non-volatile memory, and the processing comprises altering what portion of the interfaces are maximally enabled to be concurrently active.

EC50) The non-transitory tangible computer readable medium of EC35, wherein the storage device comprises a reference frequency generator, and the processing comprises altering a frequency that the reference frequency generator generates.

EC51) The non-transitory tangible computer readable medium of EC35, wherein the processing comprises modifying mapping information that enables mapping device power management commands to corresponding operating power states of the storage device, the modifying being based at least in part on information provided by the second command, and wherein the operations further comprise:

receiving an instance of a particular one of the device power management commands, and in response accessing the mapping information to determine a particular one of the operating power states, the accessing being based at least in part on the instance; and in response to the accessing, operating the storage device in accordance with the particular operating power state.

EC52) A storage device comprising:

logic circuitry enabled to receive a first command and then a second command;

logic circuitry enabled to process the second command in response to the logic circuitry enabled to receive;

wherein the second command comprises power control information; and wherein the logic circuitry enabled to process commences processing the second command while the first command is outstanding.

EC53) The storage device of EC52, wherein the logic circuitry enabled to receive comprises an interface of the storage device that is compatible with at least one storage interface standard.

EC54) The storage device of EC52, further comprising logic circuitry enabled to process the first command in accordance with the power control information.

EC55) The storage device of EC52, further comprising logic circuitry enabled to power-up the storage device in accordance with at least a portion of the power control information.

EC56) The storage device of EC55, wherein the portion of the power control information is different than corresponding power control information that is in accordance with manufacturing of the storage device.

EC57) The storage device of EC52, further comprising logic circuitry enabled to reset the storage device in accordance with at least a portion of the power control information.

EC58) The storage device of EC52, further comprising logic circuitry enabled to operate the storage device in accordance with at least a portion of the power control information across a reset and/or a power cycle of the storage device.

EC59) The storage device of EC52, further comprising logic circuitry enabled to pass along at least a portion of the power control information to at least one other storage device.

EC60) The storage device of EC59, further comprising logic circuitry enabled to receive power usage information from the at least one other storage device.

EC61) The storage device of EC60, wherein a host provides the first and the second commands, and further comprising logic circuitry enabled to pass along at least a portion of the power usage information to the host.

EC62) The storage device of EC52, further comprising non-volatile memory, and wherein the processing comprises altering what portion of the non-volatile memory is maximally enabled to be concurrently active.

EC63) The storage device of EC62, wherein the non-volatile memory comprises one or more flash memory devices, and the altering comprises altering how many of the flash memory devices are maximally enabled to be concurrently active.

EC64) The storage device of EC63, wherein the altering how many of the flash memory devices are maximally enabled to be concurrently active comprises accessing predetermined flash memory device power consumption information based at least in part on at least a portion of the power control information.

EC65. The storage device of EC63, further comprising logic circuitry enabled to measure power consumption of at least some of the flash memory devices, and wherein the altering how many of the flash memory devices are maximally enabled to be concurrently active comprises accessing at least a portion of the measured power consumption based at least in part on at least a portion of the power control information.

EC66) The storage device of EC52, further comprising one or more interfaces to non-volatile memory, and wherein the processing comprises altering what portion of the interfaces are maximally enabled to be concurrently active.

EC67) The storage device of EC52, further comprising a reference frequency generator, and wherein the processing comprises altering a frequency that the reference frequency generator generates.

EC68) The storage device of EC52, wherein the processing comprises modifying mapping information that enables mapping device power management commands to corresponding operating power states of the storage device, the modifying being based at least in part on information provided by the second command, and further comprising:
logic circuitry enabled to receive an instance of a particular one of the device power management commands, and in response to access the mapping information to determine a particular one of the operating power states, the access being based at least in part on the instance; and
logic circuitry enabled, in response to the accessing, to operate the storage device in accordance with the particular operating power state.

EC69) A method comprising:
in a storage device, receiving a command in accordance with a storage interface standard, the command comprising power control information;
operating the storage device in accordance with at least a persistent portion of the power control information across a reset of the storage device;
operating the storage device in accordance with the persistent portion across a power cycle of the storage device; and
wherein the reset and the power cycle occur after the receiving.

EC70) The method of EC69, wherein the operating the storage device in accordance with the at least the persistent portion enables not exceeding a new power dissipation maximum.

EC71) The method of EC69, wherein the command is a second command, and further comprising:
in the storage device, receiving, before the receiving of the second command, a first
command in accordance with the storage interface standard; and commencing processing of the second command while the first command is outstanding.

EC72) The method of EC71, wherein the storage device comprises non-volatile memory, and the processing comprises altering what portion of the non-volatile memory is maximally enabled to be concurrently active.

EC73) The method of EC72, wherein the non-volatile memory comprises one or more flash memory devices, and the altering comprises altering how many of the flash memory devices are maximally enabled to be concurrently active.

EC74) The method of EC71, wherein the storage device comprises one or more interfaces to non-volatile memory, and the processing comprises altering what portion of the interfaces are maximally enabled to be concurrently active.

EC75) A system comprising:
means for receiving, in a storage device, a command in accordance with a storage interface standard, the command comprising power control information;
means for operating the storage device in accordance with at least a persistent portion of the power control information across a reset of the storage device;
means for operating the storage device in accordance with the at least the persistent portion across a power cycle of the storage device; and
wherein the reset and the power cycle occur after receiving the command.

EC76) The system of EC75, wherein the means for operating the storage device in accordance with the at least the persistent portion enables not exceeding a new power dissipation maximum.

EC77) The system of EC75, wherein the command is a second command, and further comprising:
means for receiving, in the storage device and before the receiving of the second command, a first command in accordance with the storage interface standard; and
means for commencing processing of the second command while the first command is outstanding.

EC78) The system of EC77, wherein the storage device comprises non-volatile memory, and the processing comprises altering what portion of the non-volatile memory is maximally enabled to be concurrently active.

EC79) The system of EC78, wherein the non-volatile memory comprises one or more flash memory devices, and the altering comprises altering how many of the flash memory devices are maximally enabled to be concurrently active.

EC80) The system of EC77, wherein the storage device comprises one or more interfaces to non-volatile memory, and the processing comprises altering what portion of the interfaces are maximally enabled to be concurrently active.

EC81) A non-transitory tangible compute readable medium having a set of instructions stored therein that when executed by a processing element cause the processing element to perform and/or control operations comprising:
 in a storage device, receiving a command in accordance with a storage interface standard, the command comprising power control information;
 operating the storage device in accordance with at least a persistent portion of the power control information across a reset of the storage device;
 operating the storage device in accordance with the at least the persistent portion across a power cycle of the storage device; and
 wherein the reset and the power cycle occur after the receiving.

EC82) The non-transitory tangible computer readable medium of EC81, wherein the operating the storage device in accordance with the at least the persistent portion enables not exceeding a new power dissipation maximum.

EC83) The non-transitory tangible computer readable medium of EC81, wherein the command is a second command, and the operations further comprise:
 in the storage device, receiving, before the receiving of the second command, a first command in accordance with the storage interface standard; and
 commencing processing of the second command while the first command is outstanding.

EC84) The non-transitory tangible computer readable medium of EC83, wherein the storage device comprises non-volatile memory, and the processing comprises altering what portion of the non-volatile memory is maximally enabled to be concurrently active.

EC85) The non-transitory tangible computer readable medium of EC84, wherein the non-volatile memory comprises one or more flash memory devices, and the altering comprises altering how many of the flash memory devices are maximally enabled to be concurrently active.

EC86) The non-transitory tangible computer readable medium of EC83, wherein the storage device comprises one or more interfaces to non-volatile memory, and the processing comprises altering what portion of the interfaces are maximally enabled to be concurrently active.

EC87) A storage device comprising:
 logic circuitry enabled to receive a command in accordance with a storage interface standard, the command comprising power control information;
 logic circuitry enabled to operate the storage device in accordance with at least a persistent portion of the power control information across a reset of the storage device;
 logic circuitry enabled to operate the storage device in accordance with the at least the persistent portion across a power cycle of the storage device; and
 wherein the reset and the power cycle occur after the receiving.

EC88) The storage device of EC87, wherein the operating the storage device in accordance with the at least the persistent portion enables not exceeding a new power dissipation maximum.

EC89) The storage device of EC87, wherein the command is a second command, and further comprising:
 logic circuitry enabled to receive, before the receiving of the second command, a first command in accordance with the storage interface standard; and
 logic circuitry enabled to commence processing of the second command while the first command is outstanding.

EC90) The storage device of EC89, wherein the storage device comprises non-volatile memory, and the processing comprises altering what portion of the non-volatile memory is maximally enabled to be concurrently active.

EC91) The storage device of EC90, wherein the non-volatile memory comprises one or more flash memory devices, and the altering comprises altering how many of the flash memory devices are maximally enabled to be concurrently active.

EC92) The storage device of EC89, wherein the storage device comprises one or more interfaces to non-volatile memory, and the processing comprises altering what portion of the interfaces are maximally enabled to be concurrently active.

EC93) A method comprising:
 in a storage device, receiving a command in accordance with a storage interface standard, the command comprising power control information;
 via the storage device, passing along at least a portion of the power control information to at least one other storage device; and
 in the storage device, receiving power usage information from the at least one other storage device.

EC94) The method of EC93, wherein a host provides the command, and further comprising the storage device passing along at least a portion of the power usage information to the host.

EC95) The method of EC93, wherein the command is a second command, and further comprising:
 in the storage device, receiving, before the receiving of the second command, a first command in accordance with the storage interface standard; and
 commencing processing of the second command while the first command is outstanding.

EC96) The method of EC95, wherein the storage device comprises non-volatile memory, and the processing comprises altering what portion of the non-volatile memory is maximally enabled to be concurrently active.

EC97) The method of EC96, wherein the non-volatile memory comprises one or more flash memory devices, and the altering comprises altering how many of the flash memory devices are maximally enabled to be concurrently active.

EC98) The method of EC95, wherein the storage device comprises one or more interfaces to non-volatile memory, and the processing comprises altering what portion of the interfaces are maximally enabled to be concurrently active.

EC99) A system comprising:
 means for receiving, in a storage device, a command in accordance with a storage interface standard, the command comprising power control information;

means for passing along, via the storage device, at least a portion of the power control information to at least one other storage device; and means for receiving power usage information, in the storage device, from the at least one other storage device.

EC100) The system of EC99, wherein a host provides the command, and further comprising means for passing along at least a portion of the power usage information to the host.

EC101) The system of EC99, wherein the command is a second command, and further comprising:

means for receiving, in the storage device and before the receiving of the second command, a first command in accordance with the storage interface standard; and means for commencing processing of the second command while the first command is outstanding.

EC102) The system of EC101, wherein the storage device comprises non-volatile memory, and the processing comprises altering what portion of the non-volatile memory is maximally enabled to be concurrently active.

EC103) The system of EC102, wherein the non-volatile memory comprises one or more flash memory devices, and the altering comprises altering how many of the flash memory devices are maximally enabled to be concurrently active.

EC104) The system of EC101, wherein the storage device comprises one or more interfaces to non-volatile memory, and the processing comprises altering what portion of the interfaces are maximally enabled to be concurrently active.

EC105) A non-transitory tangible computer readable medium having a set of instructions stored therein that when executed by a processing element cause the processing element to perform and/or control operations comprising:

in a storage device, receiving a command in accordance with a storage interface standard, the command comprising power control information;

via the storage device, passing along at least a portion of the power control information to at least one other storage device; and in the storage device, receiving power usage information from the at least one other storage device.

EC106) The non-transitory tangible computer readable medium of EC105, wherein a host provides the command, and wherein the operations further comprise the storage device passing along at least a portion of the power usage information to the host.

EC107) The non-transitory tangible computer readable medium of EC105, wherein the command is a second command, and wherein the operations further comprise: in the storage device, receiving, before the receiving of the second command, a first command in accordance with the storage interface standard; and commencing processing of the second command while the first command is outstanding.

EC108) The non-transitory tangible computer readable medium of EC107, wherein the storage device comprises non-volatile memory, and the processing comprises altering what portion of the non-volatile memory is maximally enabled to be concurrently active.

EC109) The non-transitory tangible computer readable medium of EC108, wherein the non-volatile memory comprises one or more flash memory devices, and the altering comprises altering how many of the flash memory devices are maximally enabled to be concurrently active.

EC110) The non-transitory tangible computer readable medium of EC107, wherein the storage device comprises one or more interfaces to non-volatile memory, and the processing comprises altering what portion of the interfaces are maximally enabled to be concurrently active.

EC111) A storage device comprising:

logic circuitry enabled to receive a command in accordance with a storage interface standard, the command comprising power control information;

logic circuitry enabled to pass along at least a portion of the power control information to at least one other storage device; and logic circuitry enabled to receive power usage information from the at least one other storage device.

EC112) The storage device of EC111, wherein a host provides the command, and the storage device is enabled to pass along at least a portion of the power usage information to the host.

EC113) The storage device of EC111, wherein the command is a second command, and further comprising:

logic circuitry enabled to receive, before the receiving of the second command, a first command in accordance with the storage interface standard; and logic circuitry enabled to commence processing of the second command while the first command is outstanding.

EC114) The storage device of EC113, further comprising non-volatile memory, and wherein the processing comprises altering what portion of the non-volatile memory is maximally enabled to be concurrently active.

EC115) The storage device of EC114, wherein the non-volatile memory comprises one or more flash memory devices, and the altering comprises altering how many of the flash memory devices are maximally enabled to be concurrently active.

EC16) The storage device of EC113, further comprising one or more interfaces to non-volatile memory, and wherein the processing comprises altering what portion of the interfaces are maximally enabled to be concurrently active.

EC117) A method comprising:

while operating an interface in accordance with a current power mode and in a context of a current operating power state, receiving a request to transition the operating of the interface to a specified power mode;

in response to the receiving, accessing information concerning the current operating power state;

based at least in part on at least some results of the accessing, determining a new power mode;

operating the interface in accordance with the new power mode; and wherein the new power mode is different than the specified power mode.

EC118) The method of EC117, wherein the operating the interface in accordance with the new power mode is conditional, and further comprising conditionally operating the interface in accordance with the specified power mode.

EC119) The method of EC117, wherein the interface is compatible with at least one storage interface standard.

EC120) The method of EC117, wherein the interface is comprised in a storage device that comprises the information concerning the current operating power state.

EC121 The method of EC117, wherein the interface is comprised in a host that comprises the information concerning the current operating power state.

EC122) The method of EC117, wherein the specified power mode is a higher-power mode than the current power mode, and the new power mode is identical to the current power mode.

EC123) The method of EC122, wherein the current operating power state prioritizes decreased power over increased performance.

EC124) The method of EC117, wherein the specified power mode is a lower-power mode than the current power mode, and the new power mode is identical to the current power mode.

EC125) The method of EC124, wherein the current operating power state prioritizes increased performance over decreased power.

EC126) A system comprising:
  means for, while operating an interlace in accordance with a current power mode and in a context of a current operating power state, receiving a request to transition the operating of the interface to a specified power mode;
  means for, in response to the receiving, accessing information concerning the current operating power state;
  means for, based at least in part on at least some results of the means for accessing, determining a new power mode;
  means for operating the interface in accordance with the new power mode; and
  wherein the new power mode is different than the specified power mode.

EC127 The system of EC126, wherein the operating the interface in accordance with the new power mode is conditional, and further comprising means for conditionally operating the interface in accordance with the specified power mode.

EC128) The system of EC126, wherein the interface is compatible with at least one storage interface standard.

EC129) The system of EC126, wherein the interface is comprised in a storage device that comprises the information concerning the current operating power state.

EC130) The system of EC126, wherein the interface is comprised in a host that comprises the information concerning the current operating power state.

EC131) The system of EC126, wherein the specified power mode is a higher-power mode than the current power mode, and the new power mode is identical to the current power mode.

EC132) The system of EC131, wherein the current operating power state prioritizes decreased power over increased performance.

EC133) The system of EC126, wherein the specified power mode is a lower-power mode than the current power mode, and the new power mode is identical to the current power mode.

EC134) The system of EC133, wherein the current operating power state prioritizes increased performance over decreased power.

EC135) A non-transitory tangible computer readable medium having a set of instructions stored therein that when executed by a processing element cause the processing element to perform and/or control operations comprising:
  while operating an interface in accordance with a current power mode and in a context of a current operating power state, receiving a request to transition the operating of the interface to a specified power mode;
  in response to the receiving, accessing information concerning the current operating power state;
  based at least in part on at least some results of the accessing, determining a new power mode;
  operating the interface in accordance with the new power mode; and
  wherein the new power mode is different than the specified power mode.

EC136) The non-transitory tangible computer readable medium of EC135, wherein the operating the interface in accordance with the new power mode is conditional, and wherein the operations further comprise conditionally operating the interface in accordance with the specified power mode.

EC137) The non-transitory tangible computer readable medium of EC135, wherein the interface is compatible with at least one storage interface standard.

EC138) The non-transitory tangible computer readable medium of EC135, wherein the interface is comprised in a storage device that comprises the information concerning the current operating power state.

EC139) The non-transitory tangible computer readable medium of EC135, wherein the interface is comprised in a host that comprises the information concerning the current operating power state.

EC140) The non-transitory tangible computer readable medium of EC135, wherein the specified power mode is a higher-power mode than the current power mode, and the new power mode is identical to the current power mode.

EC141) The non-transitory tangible computer readable medium of EC140, wherein the current operating power state prioritizes decreased power over increased performance.

EC142) The non-transitory tangible computer readable medium of EC135, wherein the specified power mode is a lower-power mode than the current power mode, and the new power mode is identical to the current power mode.

EC143) The non-transitory tangible computer readable medium of EC142, wherein the current operating power state prioritizes increased performance over decreased power.

EC144) An apparatus comprising:
  logic circuitry enabled, while operating an interface in accordance with a current power mode and in a context of a current operating power state, to receive a request to transition the operating of the interface to a specified power mode;
  logic circuitry enabled, in response to the receiving, to access information concerning the current operating power state;
  logic circuitry enabled, based at least in part on at least some results of the accessing, to determine a new power mode;
  logic circuitry enabled to operate the interface in accordance with the new power mode; and
  wherein the new power mode is different than the specified power mode.

EC145) The apparatus of EC144, wherein the operating the interface in accordance with the new power mode is conditional, and further comprising logic circuitry enabled to conditionally operate the interface in accordance with the specified power mode.

EC146) The apparatus of EC144, wherein the interface is compatible with at least one storage interface standard.

EC147) The apparatus of EC144, wherein the interface is comprised in a storage device that comprises the information concerning the current operating power state.

EC148) The apparatus of EC144, wherein the interface is comprised in a host that comprises the information concerning the current operating power state.

EC149) The apparatus of EC144, wherein the specified power mode is a higher-power mode than the current power mode, and the new power mode is identical to the current power mode.

EC150) The apparatus of EC149, wherein the current operating power state prioritizes decreased power over increased performance.

EC151) The apparatus of EC144, wherein the specified power mode is a lower-power mode than the current power mode, and the new power mode is identical to the current power mode.

EC152) The apparatus of EC151, wherein the current operating power state prioritizes increased performance over decreased power.

EC153) A method comprising:
in a device, receiving a power control command, and in response modifying mapping information that enables mapping device power management commands to corresponding operating power states of the device, the modifying being based at least in part on information provided by the power control command;
in the device, receiving an instance of a particular one of the device power management commands, and in response accessing the mapping information to determine a particular one of the operating power states, the accessing being based at least in part on the instance; and
in the device, in response to the accessing, operating the device in accordance with the particular operating power state.

EC154) The method of EC153, wherein the device comprises a storage device and the acts of receiving are via an interface of the storage device that is compatible with at least one storage interface standard.

EC155) The method of EC153, wherein the device power management commands comprise one or more of an IDLE command, a STANDBY command, and a SLEEP command.

EC156) The method of EC153, wherein the operating power states comprise one or more of a High Performance power state, an Active power state, a Low Power power state, an Idle power state, a Standby power state, and a Sleep power state.

EC157) The method of EC153, wherein the power control command is a second command, and further comprising:
in the storage device, receiving, before the receiving of the second command, a first command via the interface; and
commencing processing of the second command while the first command is outstanding.

EC158) The method of EC157, wherein the storage device comprises non-volatile memory, and the processing comprises altering what portion of the non-volatile memory is maximally enabled to be concurrently active.

EC159) The method of EC158, wherein the non-volatile memory comprises one or more flash memory devices, and the altering comprises altering how many of the flash memory devices are maximally enabled to be concurrently active.

EC160) The method of EC157, wherein the storage device comprises one or more interfaces to non-volatile memory, and the processing comprises altering what portion of the interfaces are maximally enabled to be concurrently active.

EC161) A system comprising:
means for, in a device, receiving a power control command, and in response modifying mapping information that enables mapping device power management commands to corresponding operating power states of the device, the modifying being based at least in part on information provided by the power control command;
means for, in the device, receiving an instance of a particular one of the device power management commands, and in response accessing the mapping information to determine a particular one of the operating power states, the accessing being based at least in part on the instance; and
means for, in the device, and in response to the accessing, operating the device in accordance with the particular operating power state.

EC162) The system of EC161, wherein the device comprises a storage device and the commands are receivable via an interface of the storage device that is compatible with at least one storage interface standard.

EC163) The system of EC161, wherein the device power management commands comprise one or more of an IDLE command, a STANDBY command, and a SLEEP command.

EC164) The system of EC161, wherein the operating power states comprise one or more of a High Performance power state, an Active power state, a Low Power power state, an Idle power state, a Standby power state, and a Sleep power state.

EC165) The system of EC161, wherein the power control command is a second command, and further comprising:
means for, in the storage device, receiving, before the receiving of the second command, a first command via the interface; and
means for commencing processing of the second command while the first command is outstanding.

EC166) The system of EC165, wherein the storage device comprises non-volatile memory, and the processing comprises altering what portion of the non-volatile memory is maximally enabled to be concurrently active.

EC167) The system of EC166, wherein the non-volatile memory comprises one or more flash memory devices, and the altering comprises altering how many of the flash memory devices are maximally enabled to be concurrently active.

EC168) The system of EC165, wherein the storage device comprises one or more interfaces to non-volatile memory, and the processing comprises altering what portion of the interfaces are maximally enabled to be concurrently active.

EC169) A non-transitory tangible computer readable medium having a set of instructions stored therein that when executed by a processing element cause the processing element to perform and/or control operations comprising:
in a device, receiving a power control command, and in response modifying mapping information that enables mapping device power management commands to corresponding operating power states of the device, the modifying being based at least in part on information provided by the power control command;
in the device, receiving an instance of a particular one of the device power management commands, and in response accessing the mapping information to determine a particular one of the operating power states, the accessing being based at least in part on the instance; and
in the device, in response to the accessing, operating the device in accordance with the particular operating power state.

EC170) The non-transitory tangible computer readable medium of EC169, wherein the device comprises a storage device and the commands are receivable via an interface of the storage device that is compatible with at least one storage interface standard.

EC171) The non-transitory tangible computer readable medium of EC169, wherein the device power management commands comprise one or more of an IDLE command, a STANDBY command, and a SLEEP command.

EC172) The non-transitory tangible computer readable medium of EC169, wherein the operating power states comprise one or more of a High Performance power state, an Active power state, a Low Power power stare, an Idle power state, a Standby power state, and a Sleep power state.

EC173) The non-transitory tangible computer readable medium of EC169, wherein the power control command is a second command, and the operations further comprise:
 in the storage device, receiving, before the receiving of the second command, a first command via the interface; and
 commencing processing of the second command while the first command is outstanding.

EC174) The non-transitory tangible computer readable medium of EC173, wherein the storage device comprises non-volatile memory, and the processing comprises altering what portion of the non-volatile memory is maximally enabled to be concurrently active.

EC175) The non-transitory tangible computer readable medium of EC174, wherein the non-volatile memory comprises one or more flash memory devices, and the altering comprises altering how many of the flash memory devices are maximally enabled to be concurrently active.

EC176) The non-transitory tangible computer readable medium of EC173, wherein the storage device comprises one or more interfaces to non-volatile memory, and the processing comprises altering what portion of the interfaces are maximally enabled to be concurrently active.

EC177) An apparatus comprising:
 logic circuitry enabled to receive, in a device, a power control command, and in response modifying mapping information that enables mapping device power management commands to corresponding operating power states of the device, the modifying being based at least in part on information provided by the power control command;
 logic circuitry enabled to receive, in the device, an instance of a particular one of the device power management commands, and in response accessing the mapping information to determine a particular one of the operating power states, the accessing being based at least in part on the instance; and
 logic circuitry enabled to operate the device in response to the accessing and in accordance with the particular operating power state.

EC178) The apparatus of EC177, wherein the device comprises a storage device and the commands are receivable via an interface of the storage device that is compatible with at least one storage interface standard.

EC179) The apparatus of EC177, wherein the device power management commands comprise one or more of an IDLE command, a STANDBY command, and a SLEEP command.

EC180) The apparatus of EC177, wherein the operating power states comprise one or more of a High Performance power state, an Active power state, a Low Power power state, an Idle power state, a Standby power state, and a Sleep power state.

EC181) The apparatus of EC177, wherein the power control command is a second command, and further comprising:
 logic circuitry enabled to receive, in the storage device and before the receiving of the second command, a first command via the interface; and
 logic circuitry enabled to commence processing of the second command while the first command is outstanding.

EC182) The apparatus of EC181, wherein the storage device comprises non-volatile memory, and the processing comprises altering what portion of the non-volatile memory is maximally enabled to be concurrently active.

EC183) The apparatus of EC182, wherein the non-volatile memory comprises one or more flash memory devices, and the altering comprises altering how many of the flash memory devices are maximally enabled to be concurrently active.

EC184) The apparatus of EC181, wherein the storage device comprises one or more interfaces to non-volatile memory, and the processing comprises altering what portion of the interfaces are maximally enabled to be concurrently active.

EC185) Any of the foregoing ECs having or referring to power control information, wherein the power control information specifies at least one of an absolute power level and a relative power level.

EC186) Any of the foregoing ECs having or referring to an absolute power level, wherein the absolute power level is any one of an average power level and a maximum power level.

EC187) Any of the foregoing ECs having or referring to an absolute power level, wherein the absolute power level is a maximum power level.

EC188) Any of the foregoing ECs having or referring to a relative power level, wherein the relative power level specifies any one of a fraction less than one of a current power level and a multiplier greater than one of a current power level.

EC189) Any of the foregoing ECs having or referring to a command, wherein the command is provided by a host.

EC190) Any of the foregoing ECs having or referring to first and second commands, wherein the first and the second commands are provided by a host.

EC191) Any of the foregoing ECs having or referring to a host and a storage device, wherein the host is directly coupled to the storage device.

EC192) Any of the foregoing ECs having or referring to a host and a storage device, wherein the host is indirectly coupled to the storage device.

EC193) Any of the foregoing ECs having or referring to a host indirectly coupled to a storage device, wherein the indirect coupling is at least in part via any one or more of one or more expanders, one or more multiplexors, and one or more intermediate controllers.

EC194) Any of the foregoing ECs having or referring to power control information and a storage device, wherein at least a portion of the power control information is persistent across a reset and/or a power cycle of the storage device.

EC195) Any of the foregoing ECs having or referring to an outstanding first command and a storage device, wherein the first command is outstanding due to any one or more of
 the first command is queued awaiting processing by the storage device,
 the storage device has not commenced processing of the first command,
 the storage device is processing the first command, the storage device has not completed processing of the first command, response information associated with processing of the first command is awaiting transmission by the storage device, the storage device has not sent a response associated with the first command, and the first command has not been aborted.

EC196) Any of the foregoing ECs having or referring to persistent power control information, wherein persistence of the persistent power control information is unconditional.

EC197) Any of the foregoing ECs having or referring to persistent power control information, wherein persistence of the persistent power control information is conditional.

EC198) Any of the foregoing ECs having or referring to power control information and persistent power control information, wherein persistence of the persistent power control information is conditional based at least in part on some of the power control information.

EC199) Any of the foregoing ECs having or referring to persistent power control information, wherein the persistence is at least in part via storage to and/or retrieval from a mode page.

EC200) Any of the foregoing ECs having or referring to a mode page, wherein the mode page is a SCSI mode page.

EC201) Any of the foregoing ECs having or referring to power usage information, wherein the power usage information comprises one or more current measurements, one or more power measurements, and/or one or more temperature measurements.

EC202) Any of the foregoing ECs having or referring to predetermined flash memory device power consumption information, wherein the predetermined flash memory device power consumption information comprises per flash device type information.

EC203) Any of the foregoing ECs having or referring to predetermined flash memory device power consumption information, wherein the predetermined flash memory device power consumption information comprises per flash device vendor information.

EC204) Any of the foregoing ECs having or referring to one or more interfaces to non-volatile memory, wherein the interfaces to non-volatile memory comprise at least one flash memory interface.

EC205) Any of the foregoing ECs having or referring to a reference frequency generator, wherein the reference frequency generator comprises one or more PLLs and/or one or more DLLs.

EC206) Any of the foregoing ECs having or referring to a storage interface standard, wherein the storage interface standard comprises one or more of a Universal Serial Bus (USB) interface standard,
a Compact Flash (CF) interface standard,
a MultiMediaCard (MMC) interface standard.
an embedded MMC (eMMC) interface standard.
a Thunderbolt interface standard.
a UFS interface standard,
a Secure Digital (SD) interface standard.
a Memory Stick interface standard,
an xD-picture card interface standard,
an Integrated Drive Electronics (IDE) interface standard.
a Serial Advanced Technology Attachment (SATA) interface standard,
an external SATA (eSATA) interface standard,
a Small Computer System Interface (SCSI) interface standard.
a Serial Attached Small Computer System Interface (SAS) interface standard.
a Fibre Channel interface standard.
an Ethernet interface standard, and
a Peripheral Component Interconnect express (PCIe) interface standard.

EC207) Any of the foregoing ECs having or referring to a flash memory interface, wherein the flash memory interface is compatible with one or more of an Open NAND Flash Interface (ONFI).
a Toggle-mode interface.
a Double-Data-Rate (DDR) synchronous interface.
a DDR2 synchronous interface,
a synchronous interface, and
an asynchronous interface.

EC208) Any of the foregoing ECs having or referring to a host, wherein the host comprises one or more of a computer,
a workstation computer,
a server computer,
a storage server.
a Storage Attached Network (SAN),
a Network Attached Storage (NAS) device.
a Direct Attached Storage (DAS) device,
a storage appliance,
a Personal Computer (PC).
a laptop computer,
a notebook computer,
a netbook computer,
a tablet device or computer,
an ultrabook computer,
an electronic reading device (an e-reader).
a Personal Digital Assistant (PDA).
a navigation system.
a (handheld) Global Positioning System (GPS) device,
an automotive control system.
an automotive media control system or computer,
a printer, copier or fax machine or all-in-one device,
a Point Of Sale (POS) device,
a cash-register.
a media player.
a television.
a media recorder.
a Digital Video Recorder (DVR),
a digital camera.
a cellular handset.
a cordless telephone handset, and
an electronic game.

EC209) Any of the foregoing ECs having or referring to a device, wherein the device comprises a storage device.

EC210) Any of the foregoing ECs having or referring to a storage device, wherein the storage device comprises one or more of an optical storage device.
a magnetic storage device.
a mechanical storage device, and
a solid-state storage device.

EC211) Any of the foregoing ECs having or referring to a storage device, wherein the storage device comprises one or more of a disk drive,
a magnetic disk drive.
a solid-state disk drive,
a solid-state disk drive having one or more flash memories, and
a tape drive.

EC212) Any of the foregoing ECs having or referring to at least one flash memory, wherein at least a portion of the at least one flash memory comprises one or more of
NAND flash technology storage cells, and
NOR flash technology storage cells.

EC213) Any of the foregoing ECs having or referring to at least one flash memory, wherein at least a portion of the at least one flash memory comprises one or more of
Single-Level Cell (SLC) flash technology storage cells, and
Multi-Level Cell (MLC) flash technology storage cells.

EC214) Any of the foregoing ECs having or referring to at least one flash memory, wherein at least a portion of the at least one flash memory comprises one or more of
polysilicon technology-based charge storage cells, and
silicon nitride technology-based charge storage cells.

EC215) Any of the foregoing ECs having or referring to at least one flash memory, wherein at least a portion of the at least one flash memory comprises one or more of
two-dimensional technology-based flash memory technology, and
three-dimensional technology-based flash memory technology.

System

In some embodiments, a device. e.g. a storage device and/or an I/O device, such as an SSD, includes an SSD controller. The SSD controller acts as a bridge between the host interface and NVM of the SSD, and executes commands of a host protocol sent from a computing host via a host interface of the SSD. At least some of the commands direct the SSD to write and read the NVM with data sent from and to the computing host, respectively. In further embodiments, the SSD controller is enabled to use a map to translate between LBAs of the host protocol and physical storage addresses in the NVM. In further embodiments, at least a portion of the map is used for private storage (not visible to the computing host) of the I/O device. For example, a portion of the LBAs not accessible by the computing host is used by the I/O device to manage access to logs, statistics, or other private data.

In some embodiments, accessing compressed data of varying-sized quanta in NVM provides improved storage efficiency in some usage scenarios. For example, an SSD controller receives (uncompressed) data from a computing host (e.g., relating to a disk write command), compresses the data, and stores the compressed data into flash memory. In response to a subsequent request from the computing host (e.g., relating to a disk read command), the SSD controller reads the compressed data from the flash memory, uncompresses the compressed data, and provides the uncompressed data to the computing host. The compressed data is stored in the flash memory according to varying-sized quanta, the quanta size varying due to, e.g., compression algorithm, operating node, and compression effectiveness on various data. The SSD controller uncompresses the data in part by consulting an included map table to determine where header(s) are stored in the flash memory. The SSD controller parses the header(s) obtained from the flash memory to determine where appropriate (compressed) data is stored in the flash memory. The SSD controller uncompresses the appropriate data from the flash memory to produce the uncompressed data to provide to the computing host. In the instant application, uncompress (and variants thereof) is synonymous with decompress (and variants thereof).

In various embodiments, an SSD controller includes a host interface for interfacing with a computing host, an interface for interfacing with NVM such as flash memory, and circuitry for controlling the interfaces and performing (and/or controlling various aspects of the performing) compressing and uncompressing, as well as lower-level redundancy and/or error correction, higher-level redundancy and/or error correction, and dynamic higher-level redundancy mode management with independent silicon elements.

According to various embodiments, some host interfaces are compatible with one or more of a USB interface standard, a CF interface standard, an MMC interface standard, an eMMC interface standard, a Thunderbolt interface standard, a UFS interface standard, an SD interface standard, a Memory Stick interface standard, an xD-picture card interface standard, an IDE interface standard, a SATA interface standard, a SCSI interface standard, a SAS interface standard, and a PCIe interface standard. According to various embodiments, the computing host is all or any portions of a computer, a workstation computer, a server computer, a storage server, a SAN, a NAS device, a DAS device, a storage appliance, a PC, a laptop computer, a notebook computer, a netbook computer, a tablet device or computer, an ultrabook computer, an electronic reading device (such as an e-reader), a PDA, a navigation system, a (handheld) GPS device, an automotive control system, an automotive media control system or computer, a printer, copier or fax machine or all-in-one device, a POS device, a cash-register, a media player, a television, a media recorder, a DVR, a digital camera, a cellular handset, a cordless telephone handset, and an electronic game. In some embodiments, an interfacing host (such as a SAS/SATA bridge) operates as a computing host and/or as a bridge to a computing host.

In various embodiments, the SSD controller includes one or more processors. The processors execute firmware to control and/or perform operation of the SSD controller. The SSD controller communicates with the computing host to send and receive commands and/or status as well as data. The computing host executes one or more of an operating system, a driver, and an application. Communication by the computing host with the SSD controller is optionally and/or selectively via the driver and/or via the application. In a first example all communication to the SSD controller is via the driver, and the application provides higher-level commands to the driver that the driver translates into specific commands for the SSD controller. In a second example, the driver implements a bypass mode and the application is enabled to send specific commands to the SSD controller via the driver. In a third example, a PCIe SSD controller supports one or more Virtual Functions (VFs), enabling an application, once configured, to communicate directly with the SSD controller, bypassing the driver.

According to various embodiments, some SSDs are compatible with form-factors, electrical interfaces, and/or protocols used by magnetic and/or optical non-volatile storage, such as HDDs, CD drives, and DVD drives. In various embodiments, SSDs use various combinations of zero or more parity codes, zero or more RS codes, zero or more BCH codes, zero or more Viterbi or other trellis codes, and zero or more LDPC codes.

FIG. 1A illustrates selected details of an embodiment of an SSD including an SSD controller enabled to perform device power control. The SSD controller is for managing non-volatile storage, such as implemented via NVM elements (e.g., flash memories). SSD Controller 100 is communicatively coupled via one or more External Interfaces 110 to a host (not illustrated). According to various embodiments, External Interfaces 110 are one or more of: a SATA interface; a SAS interface; a PCIe interface; a Fibre Channel interface; an Ethernet Interface (such as 10 Gigabit Ethernet); a non-standard version of any of the preceding interfaces; a custom interface; or any other type of interface used to interconnect storage and/or communications and/or computing devices. For example, in some embodiments, SSD Controller 100 includes a SATA interface and a PCIe interface.

SSD Controller 100 is further communicatively coupled via one or more Device Interfaces 190 to NVM 199 including one or more storage devices, such as one or more instances of Flash Device 192. According to various embodiments, Device Interfaces 190 are one or more of: an asynchronous interface; a synchronous interface; a single-data-rate (SDR) interface; a double-data-rate (DDR) interface; a DRAM-compatible DDR or DDR2 synchronous interface; an ONFI compatible interface, such as an ONFI 2.2 or ONFI 3.0 compatible interface; a Toggle-mode compatible flash interface; a non-standard version of any of the preceding interfaces; a custom interface; or any other type of interface used to connect to storage devices.

Each of Flash Device 192 has, in some embodiments, one or more individual Flash Die 194. According to type of a particular one of Flash Device 192, a plurality of Flash Die 194 in the particular Flash Device 192 is optionally and/or selectively accessible in parallel. Flash Device 192 is merely representative of one type of storage device enabled to communicatively couple to SSD Controller 100. In various embodiments, any type of storage device is usable, such as an SLC NAND flash memory, MLC NAND flash memory, NOR flash memory, flash memory using polysilicon or silicon nitride technology-based charge storage cells, two- or three-dimensional technology-based flash memory, read-only memory, static random access memory, dynamic random access memory, ferromagnetic memory, phase-change memory, racetrack memory. ReRAM, or any other type of memory device or storage medium.

According to various embodiments, Device Interfaces 190 are organized as: one or more busses with one or more instances of Flash Device 192 per bus; one or more groups of busses with one or more instances of Flash Device 192 per bus, having busses in a group generally accessed in parallel; or any other organization of one or more instances of Flash Device 192 onto Device Interfaces 190.

Continuing in FIG. 1A. SSD Controller 100 has one or more modules, such as Host Interfaces 111. Data Processing 121, Buffer 131. Map 141. Recycler 151, ECC 161. Device Interface Logic 191, and CPU 171. The specific modules and interconnections illustrated in FIG. 1A are merely representative of one embodiment, and many arrangements and interconnections of some or all of the modules, as well as additional modules not illustrated, are conceived. In a first example, in some embodiments, there are two or more Host Interfaces 111 to provide dual-porting. In a second example, in some embodiments, Data Processing 121 and/or ECC 161 are combined with Buffer 131. In a third example, in some embodiments, Host Interfaces 111 is directly coupled to Buffer 131, and Data Processing 121 optionally and/or selectively operates on data stored in Buffer 131. In a fourth example, in some embodiments, Device Interface Logic 191 is directly coupled to Buffer 131, and ECC 161 optionally and/or selectively operates on data stored in Buffer 131.

Host Interfaces 111 sends and receives commands and/or data via External Interfaces 110, and, in some embodiments, tracks progress of individual commands via Tag Tracking 113. For example, the commands include a read command specifying an address (such as an LBA) and an amount of data (such as a number of LBA quanta. e.g., sectors) to read; in response the SSD provides read status and/or read data. For another example, the commands include a write command specifying an address (such as an LBA) and an amount of data (such as a number of LBA quanta. e.g., sectors) to write; in response the SSD provides write status and/or requests write data and optionally subsequently provides write status. For yet another example, the commands include a de-allocation command (e.g. a trim command) specifying one or more addresses (such as one or more LBAs) that no longer need be allocated; in response the SSD modifies the Map accordingly and optionally provides de-allocation status. In some contexts an ATA compatible TRIM command is an exemplary de-allocation command. For yet another example, the commands include a super capacitor test command or a data hardening success query; in response, the SSD provides appropriate status. In some embodiments, Host Interfaces 111 is compatible with a SATA protocol and, using NCQ commands, is enabled to have up to 32 pending commands, each with a unique tag represented as a number from 0 to 31. In some embodiments, Tag Tracking 113 is enabled to associate an external tag for a command received via External Interfaces 110 with an internal tag used to track the command during processing by SSD Controller 100.

According to various embodiments, one or more of: Data Processing 121 optionally and/or selectively processes some or all data sent between Buffer 131 and External Interfaces 110; and Data Processing 121 optionally and/or selectively processes data stored in Buffer 131. In some embodiments, Data Processing 121 uses one or more Engines 123 to perform one or more of: formatting; reformatting; transcoding and any other data processing and/or manipulation task.

Buffer 131 stores data sent to/from External Interfaces 110 from/to Device Interfaces 190. In some embodiments, Buffer 131 additionally stores system data, such as some or all map tables, used by SSD Controller 100 to manage one or more instances of Flash Device 192. In various embodiments, Buffer 131 has one or more of: Memory 137 used for temporary storage of data; DMA 133 used to control movement of data to and/or from Buffer 131; and ECC-X 135 used to provide higher-level error correction and/or redundancy functions; and other data movement and/or manipulation functions. An example of a higher-level redundancy function is a RAID-like capability (e.g. RASIE), with redundancy at a flash device level (e.g., multiple ones of Flash Device 192) and/or a flash die level (e.g., Flash Die 194) instead of at a disk level.

According to various embodiments, one or more of: ECC 161 optionally and/or selectively processes some or all data sent between Buffer 131 and Device Interfaces 190; and ECC 161 optionally and/or selectively processes data stored in Buffer 131. In some embodiments, ECC 161 is used to provide lower-level error correction and/or redundancy functions, such as in accordance with one or more ECC techniques. In some embodiments, ECC 161 implements one or more of: a CRC code; a Humming code; an RS code; a BCH code; an LDPC code; a Viterbi code; a trellis code; a hard-decision code; a soft-decision code; an erasure-based code; any error detecting and/or correcting code; and any combination of the preceding. In some embodiments, ECC 161 includes one or more decoders (such as LDPC decoders).

Device Interface Logic 191 controls instances of Flash Device 192 via Device Interfaces 190. Device Interface Logic 191 is enabled to send data to/from the instances of Flash Device 192 according to a protocol of Flash Device

192. Device Interface Logic 191 includes Scheduling 193 to selectively sequence control of the instances of Flash Device 192 via Device Interfaces 190. For example, in some embodiments, Scheduling 193 is enabled to queue operations to the instances of Flash Device 192, and to selectively send the operations to individual ones of the instances of Flash Device 192 (or Flash Die 194) as individual ones of the instances of Flash Device 192 (or Flash Die 194) are available.

Map 141 converts between data addressing used on External Interfaces 110 and data addressing used on Device Interfaces 190, using Table 143 to map external data addresses to locations in NVM 199. For example, in some embodiments, Map 141 converts LBAs used on External Interfaces 110 to block and/or page addresses targeting one or more Flash Die 194, via mapping provided by Table 143. For LBAs that have never been written since drive manufacture or de-allocation, the Map points to a default value to return if the LBAs are read. For example, when processing a de-allocation command, the Map is modified so that entries corresponding to the de-allocated LBAs point to one of the default values. In various embodiments, there are various default values, each having a corresponding pointer. The plurality of default values enables reading some de-allocated LBAs (such as in a first range) as one default value, while reading other de-allocated LBAs (such as in a second range) as another default value. The default values, in various embodiments, are defined by flash memory, hardware, firmware, command and/or primitive arguments and/or parameters, programmable registers, or various combinations thereof.

In some embodiments, Map 141 uses Table 143 to perform and/or to look up translations between addresses used on External Interfaces 110 and data addressing used on Device Interfaces 190. According to various embodiments, Table 143 is one or more of: a one-level map; a two-level map; a multi-level map; a map cache; a compressed map; any type of mapping from one address space to another; and any combination of the foregoing. According to various embodiments, Table 143 includes one or more of: static random access memory; dynamic random access memory; NVM (such as flash memory); cache memory; on-chip memory; off-chip memory; and any combination of the foregoing.

In some embodiments, Recycler 151 performs garbage collection. For example, in some embodiments, instances of Flash Device 192 contain blocks that must be erased before the blocks are re-writeable. Recycler 151 is enabled to determine which portions of the instances of Flash Device 192 are actively in use (e.g., allocated instead of de-allocated), such as by scanning a map maintained by Map 141, and to make unused (e.g., de-allocated) portions of the instances of Flash Device 192 available for writing by erasing the unused portions. In further embodiments, Recycler 151 is enabled to move data stored within instances of Flash Device 192 to make larger contiguous portions of the instances of flash Device 192 available for writing.

In some embodiments, instances of Flash Device 192 are selectively and/or dynamically configured, managed, and/or used to have one or more bands for storing data of different types and/or properties. A number, arrangement, size, and type of the bands are dynamically changeable. For example, data from a computing host is written into a hot (active) band, while data from Recycler 151 is written into a cold (less active) band. In some usage scenarios, if the computing host writes a long, sequential stream, then a size of the hot band grows, whereas if the computing host does random writes or few writes, then a size of the cold band grows.

CPU 171 controls various portions of SSD Controller 100. CPU 171 includes CPU Core 172. CPU Core 172 is, according to various embodiments, one or more single-core or multi-core processors. The individual processors cores in CPU Core 172 are, in some embodiments, multi-threaded. CPU Core 172 includes instruction and/or data caches and/or memories. For example, the instruction memory contains instructions to enable CPU Core 172 to execute programs (e.g. software sometimes called firmware) to control SSD Controller 100. In some embodiments, some or all of the firmware executed by CPU Core 172 is stored on instances of Flash Device 192 (as illustrated, e.g., as Firmware 106 of NVM 199 in FIG. 1B).

In various embodiments, CPU 171 further includes: Command Management 173 to track and control commands received via External Interfaces 110 while the commands are in progress; Buffer Management 175 to control allocation and use of Buffer 131; Translation Management 177 to control Map 141; Coherency Management 179 to control consistency of data addressing and to avoid conflicts such as between external data accesses and recycle data accesses; Device Management 181 to control Device Interface Logic 191; Identity Management 182 to control modification and communication of identify information; Power Control 183 to control device power control operations; and optionally other management units. None, any, or all of the management functions performed by CPU 171 are, according to various embodiments, controlled and/or managed by hardware, by software (such as firmware executing on CPU Core 172 or on a host connected via External Interfaces 110), or any combination thereof.

In some embodiments, CPU 171 is enabled to perform other management tasks, such as one or more of: gathering and/or reporting performance statistics; implementing SMART; controlling power sequencing, controlling and/or monitoring and/or adjusting power consumption; responding to power failures; controlling and/or monitoring and/or adjusting clock rates; and other management tasks.

Various embodiments include a computing-host flash memory controller that is similar to SSD Controller 100 and is compatible with operation with various computing hosts, such as via adaptation of Host Interfaces 111 and/or External Interface 110. The various computing hosts include one or any combination of a computer, a workstation computer, a server computer, a storage server, a SAN, a NAS device, a DAS device, a storage appliance, a PC, a laptop computer, a notebook computer, a netbook computer, a tablet device or computer, an ultrabook computer, an electronic reading device (such as an e-reader), a PDA, a navigation system, a (handheld) GPS device, an automotive control system, an automotive media control system or computer, a printer, copier or fax machine or all-in-one device, a POS device, a cash-register, a media player, a television, a media recorder, a DVR, a digital camera, a cellular handset, a cordless telephone handset, and an electronic game.

In various embodiments, all or any portions of an SSD controller (or a computing-host flash memory controller) are implemented on a single IC, a single die of a multi-die IC, a plurality of dice of a multi-die IC, or a plurality of ICs. For example, Buffer 131 is implemented on a same die as other elements of SSD Controller 100. For another example, Buffer 131 is implemented on a different die than other elements of SSD Controller 100.

Figure 1B:
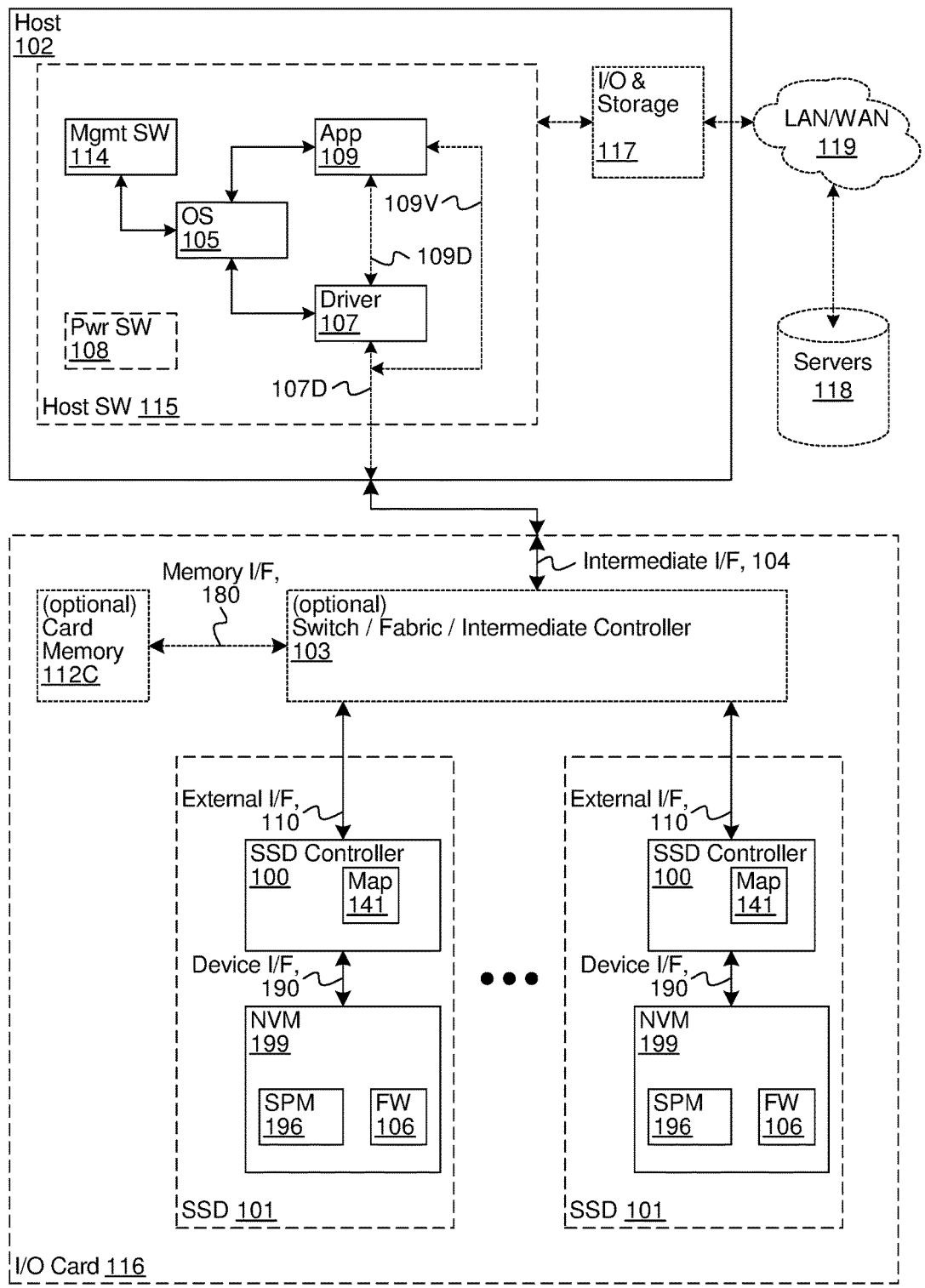
FIG. 1B illustrates selected details of various embodiments of systems including one or more instances of the SSD of FIG. 1A.

FIG. 1B illustrates selected details of various embodiments of systems including one or more instances of the SSD of FIG. 1A coupled (directly or indirectly) to a host that is enabled to operate with device power control. SSD 101 includes SSD Controller 100 coupled to NVM 199 via Device Interfaces 190. The figure illustrates various classes of embodiments; a single SSD coupled directly to a host, a plurality of SSDs each respectively coupled directly to a host via respective external interfaces, and one or more SSDs coupled indirectly to a host via various interconnection elements.

As an example embodiment of a single SSD coupled directly to a host, one instance of SSD 101 is coupled directly to Host 102 via External Interfaces 110 (e.g. Switch/Fabric/Intermediate Controller 103 is omitted, bypassed, or passed-through). As an example embodiment of a plurality of SSDs each coupled directly to a host via respective external interfaces, each of a plurality of instances of SSD 101 is respectively coupled directly to Host via a respective instance of External Interfaces 110 (e.g. Switch/Fabric/Intermediate Controller 103 is omitted, bypassed, or passed-through). As an example embodiment of one or more SSDs coupled indirectly to a host via various interconnection elements, each of one or more instances of SSD 101 is respectively coupled indirectly to Host 102. Each indirect coupling is via a respective instance of External Interfaces 110 coupled to Switch/Fabric/Intermediate Controller 103, and Intermediate Interfaces 104 coupling to Host 102.

Some of the embodiments including Switch/Fabric/Intermediate Controller 103 also include Card Memory 112C coupled via Memory Interface 180 and accessible by the SSDs. In various embodiments, one or more of the SSDs, the Switch/Fabric/Intermediate Controller, and/or the Card Memory are included on a physically identifiable module, card, or pluggable element (e.g. I/O Card 116). In some embodiments, SSD 101 (or variations thereof) corresponds to a SAS drive or a SATA drive that is coupled to an initiator operating as Host 102.

Host 102 is enabled to execute various elements of Host Software 115, such as various combinations of OS 105, Driver 107. Power Control Software 108, Application 109, and Multi-Device Management Software 114. Dotted-arrow 107D is representative of Host Software←—→I/O Device Communication. e.g. data sent/received to/from one or more of the instances of SSD 101 and from/to any one or more of OS 105 via Driver 107. Driver 107, and Application 109, either via Driver 107, or directly as a VF.

OS 105 includes and/or is enabled to operate with drivers (illustrated conceptually by Driver 107) for interfacing with the SSD. Various versions of Windows (e.g. 95, 98, ME, NT, XP, 2000, Server, Vista, and 7), various versions of Linux (e.g. Red Hat, Debian, and Ubunnu), and various versions of MacOS (e.g. 8, 9 and X) are examples of OS 105. In various embodiments, the drivers are standard and/or generic drivers (sometimes termed "shrink-wrapped" or "pre-installed") operable with a standard interface and/or protocol such as SATA, AHCI, or NVM Express, or are optionally customized and/or vendor-specific to enable use of commands specific to SSD 101. Some drives and/or drivers have pass-through modes to enable application-level programs, such as Application 109 via Optimized NAND Access (sometimes termed ONA) or Direct NAND Access (sometimes termed DNA) techniques, to communicate commands directly to SSD 101, enabling a customized application to use commands specific to SSD 101 even with a generic driver. ONA techniques include one or more of: use of non-standard modifiers (hints); use of vendor-specific commands; communication of non-standard statistics, such as actual NVM usage according to compressibility; and other techniques. DNA techniques include one or more of: use of non-standard commands or vendor-specific providing unmapped read, write, and/or erase access to the NVM; use of non-standard or vendor-specific commands providing more direct access to the NVM, such as by bypassing formatting of data that the I/O device would otherwise do; and other techniques. Examples of the driver are a driver without ONA or DNA support, an ONA-enabled driver, a DNA-enabled driver, and an ONA/DNA-enabled driver. Further examples of the driver are a vendor-provided, vendor-developed, and/r vendor-enhanced driver, and a client-provided, client-developed, and/or client-enhanced driver.

Examples of the application-level programs are an application without ONA or DNA support, an ONA-enabled application, a DNA-enabled application, and an ONA/DNA-enabled application. Dotted-arrow 109D is representative of Application←—→I/O Device Communication (e.g. bypass via a driver or bypass via a VF for an application), e.g. an ONA-enabled application and an ONA-enabled driver communicating with an SSD, such as without the application using the OS as an intermediary. Dotted-arrow 109V is representative of Application←—→I/O Device Communication (e.g. bypass via a VF for an application), e.g. a DNA-enabled application and a DNA-enabled driver communicating with an SSD, such as without the application using the OS or the driver as intermediaries.

Power Control Software 106 is conceptually representative of various embodiments implementing all or any portions of a command source agent via any combination of one or more stand alone software modules, OS 105, Driver 107, and/or Application 109.

One or more portions of NVM 199 are used, in some embodiments, for firmware storage, e.g. Firmware 106. The firmware storage includes one or more firmware images (or portions thereof). A firmware image has, for example, one or more images of firmware, executed, e.g. by CPU Core 172 of SSD Controller 100. A firmware image has, for another example, one or more images of constants, parameter values, and NVM device information, referenced, e.g. by the CPU core during the firmware execution. The images of firmware correspond. e.g., to a current firmware image and zero or more previous (with respect to firmware updates) firmware images. In various embodiments, the firmware provides for generic, standard, ONA, and/or DNA operating modes. In some embodiments, one or more of the firmware operating modes are enabled (e.g. one or more APIs are "unlocked") via keys or various software techniques, optionally communicated and/or provided by a driver.

In some embodiments, one or more portions of NVM 199 are used for non-volatile storage of power mode and/or control information, e.g. Saved Power Mode 196. Alternatively, non-volatile storage of power mode and/or control information is implemented via one or more portions of Firmware 106, such as via one or more images of manufacturing and/or operating power control constants, variables, indicators, and/or parameters.

In some embodiments lacking the Switch/Fabric/Intermediate Controller, the SSD is coupled to the Host directly via External Interfaces 110. In various embodiments, SSD Controller 100 is coupled to the Host via one or more intermediate levels of other controllers, such as a RAID controller. In some embodiments, SSD 101 (or variations thereof) corresponds to a SAS drive or a SATA drive and Switch/Fabric/Intermediate Controller 103 corresponds to an expander that is in turn coupled to an initiator, or alternatively Switch/Fabric/Intermediate Controller 103 corresponds to a bridge that is indirectly coupled to an initiator via an expander. In some embodiments, Switch/Fabric/ Intermediate Controller 103 includes one or more PCIe switches and/or fabrics.

In various embodiments, such as some of the embodiments with Host 102 as a computing host (e.g. a computer, a workstation computer, a server computer, a storage server, a SAN, a NAS device, a DAS device, a storage appliance, a PC, a laptop computer, a notebook computer, and/or a netbook computer), the computing host is optionally enabled to communicate (e.g. via optional I/O & Storage Devices/ Resources 117 and optional LAN/WAN 119) with one or more local and/or remote servers (e.g. optional Servers 118). The communication enables, for example, local and/or remote access, management, and/or usage of any one or more of SSD 101 elements. In some embodiments, the communication is wholly or partially via Ethernet. In some embodiments, the communication is wholly or partially via Fibre Channel. LAN/WAN 119 is representative, in various embodiments, of one or more Local and/or Wide Area Networks, such as any one or more of a network in a server farm, a network coupling server farms, a metro-area network, and the Internet.

In various embodiments, an SSD controller and/or a computing-host flash memory controller in combination with one or more NVMs are implemented as a non-volatile storage component, such as a USB storage component, a CF storage component, an MMC storage component, an eMMC storage component, a Thunderbolt storage component, a UPS storage component, an SD storage component, a Memory Stick storage component, and an xD-picture card storage component.

In various embodiments, all or any portions of an SSD controller (or a computing-host flash memory controller), or functions thereof, are implemented in a host that the controller is to be coupled with (e.g., Host 102 of FIG. 1B). In various embodiments, all or any portions of an SSD controller (or a computing-host flash memory controller), or functions thereof, are implemented via hardware (e.g., logic circuitry), software and/or firmware (e.g., driver software and/or SSD control firmware), or any combination thereof. For example, functionality of or associated with an ECC unit (such as similar to ECC 161 and/or ECC-X 135 of FIG. 1A) is implemented partially via software on a host and partially via a combination of firmware and hardware in an SSD controller. For another example, functionality of or associated with a recycler unit (such as similar to Recycler 151 of FIG. 1A) is implemented partially via software on a host and partially via hardware in a computing-host flash memory controller.

Device Power Control Operation

Figure 2:
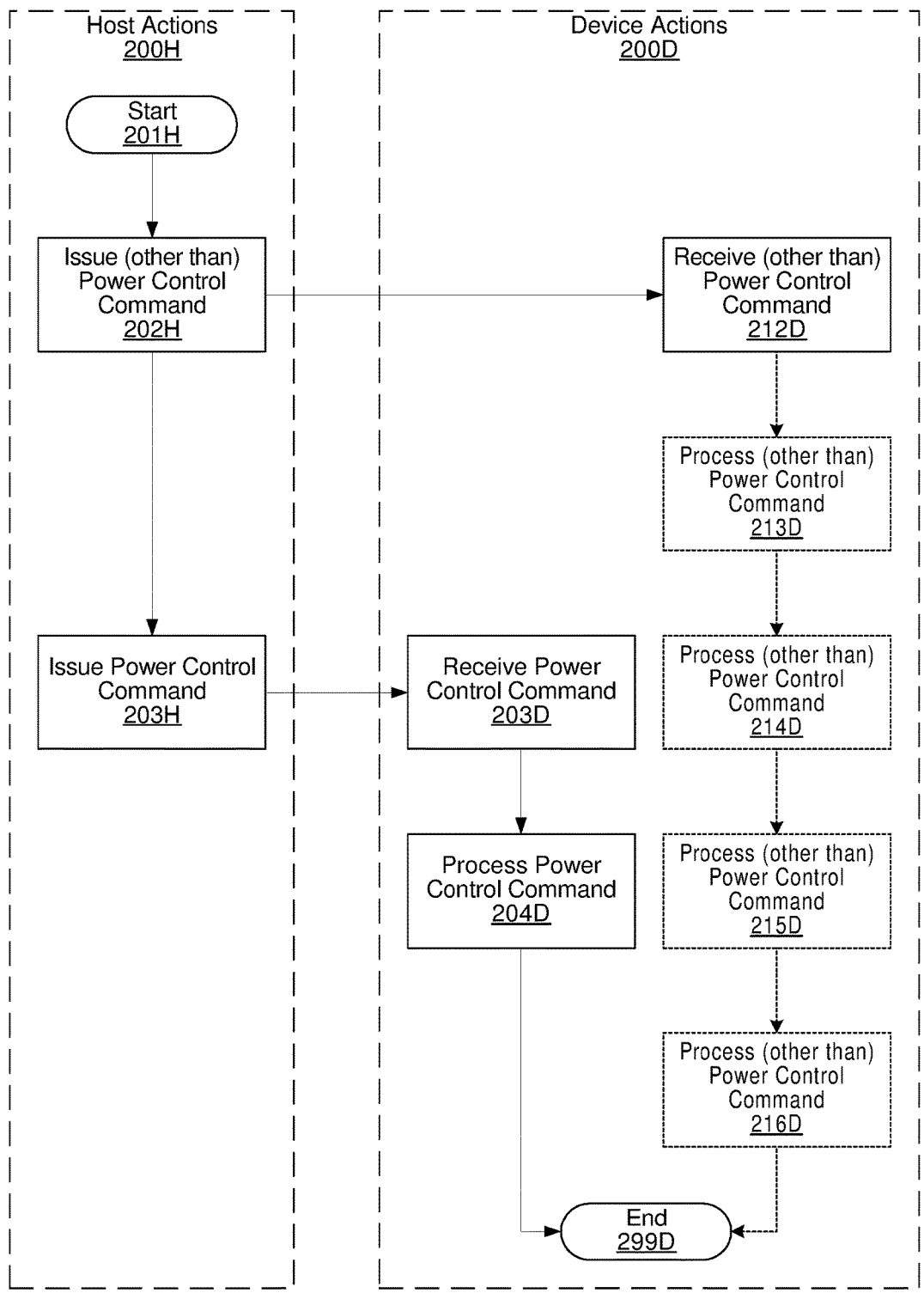
FIG. 2 illustrates selected details of various embodiments of device power control.

FIG. 2 illustrates selected details of various embodiments of device power control. The illustrated actions are performed variously by a host (e.g. Host 102 of FIG. 1B) as illustrated by a dashed-box in the left-hand portion of the figure (Host Actions 200H) and a device (e.g. an instance of SSD 101 of FIG. 1B) as illustrated by the dashed-box in the center and right-hand portions of the figure (Device Actions 200D). The host is coupled to and/or in communication with the device (e.g. as illustrated by Intermediate Interfaces 104 and optionally Switch/Fabric/Intermediate Controller 103 of FIG. 1B).

In the figure, time conceptually increases from top to bottom. For example, 212D, 213D, 214D. 215D, and 216D occur at respectively later times. For yet another example, dotted-line boxes 213D, 214D. 215D, and 216D are conceptually representative of an action that is performed, according to various embodiments, usage scenarios, and/or circumstances, before (213D and 214D), wholly or partially overlapping with (215D), or after (216D) 204D.

The following description of operation is in a context of two commands, to simplify explanation. One of the commands (the second) is a power control command, and the other one of the commands (the first) is a command that is not a power control command, e.g. a read or a write command. Other operating contexts occur where there are a multiplicity of commands, some being power control commands, and others being commands that are not power control commands. Operation in the other operating contexts are similar to the described operation, such as when considering the multiplicity of commands as overlapping windows of pairs of commands. e.g. first and second commands as described following. In summary, a power control command is sent from a host to a device and then processed, at least in some circumstances, before commands sent before the sending of the power control command are processed (e.g. the power control command is processed "out-of-order" with respect to previously sent commands).

More specifically, the actions begin (Start 201H). A host sends a first command (that is not a power control command) to a device (Issue (other than) Power Control Command 202H). In response, the device accepts the first command (Receive (other than) Power Control Command 212D), and performs operations in accordance with the first command (Process (other than) Power Control Command 213D, 214D, 215D, and 216D). Processing of the first command is then complete (End 299D). After sending the first command to the device, the host sends a second command (that is a power control command) to the device (Issue Power Control Command 203H). The second command is generated, for example, via execution of one or more power control software modules (e.g. all or any portions of Power Control Software 108 of FIG. 1B. In response, the device accepts the second command (Receive Power Control Command 203D), and immediately performs operations in accordance with the second command (Process Power Control Command 204D). Processing of the second command is then complete (End 299D).

In various embodiments, usage scenarios, and/or circumstances, the processing of the second command is variously entirely complete, partially complete, and not begun before the processing of the first command begins. For example, as illustrated conceptually by 216D, the processing of the power control command is entirely complete before the processing of the (other than) power control command begins. E.g. the (other than) power control command remains outstanding (such as remains queued) while the power control command is entirely processed. For another example, as illustrated conceptually by 215D, the processing of the power control command is entirely or partially concurrent with the processing of the (other than) power control command. For yet another example, as illustrated conceptually by 213D and 214D, the processing of the power control command is not begun before the processing of the (other than) power control command begins, continues, and/or completes. Thus, processing of the power control command begins, continues, and completes independently and irrespectively of the processing of the (other than) power control command.

In some embodiments, the power control command is a queued command and is performed without delay by the device. In some embodiments, the power control command is a queued command and is performed in any order (e.g.

with respect to other queued commands) that is convenient to and/or determined by the device (e.g. to improve performance and/or to reduce power).

In various embodiments, the power control command is issued in response to execution of one or more programs or portions thereof on the host. For example, a user invokes a power control program (e.g. Application 109 of FIG. 1B) with a directive to set power to a default setting. For yet another example, a device driver (e.g. Driver 107 of FIG. 1B) determines, such as due to inactivity and/or temperature overage, that power is to be reduced, and issues a power control command to reduce power. For yet another example, an OS (e.g. OS 105 of FIG. 1B) or portion thereof determines, such as due to expected performance requirements, that power is to be increased (or at least allowed to increase), and issues a power control command to increase power.

Figure 3:
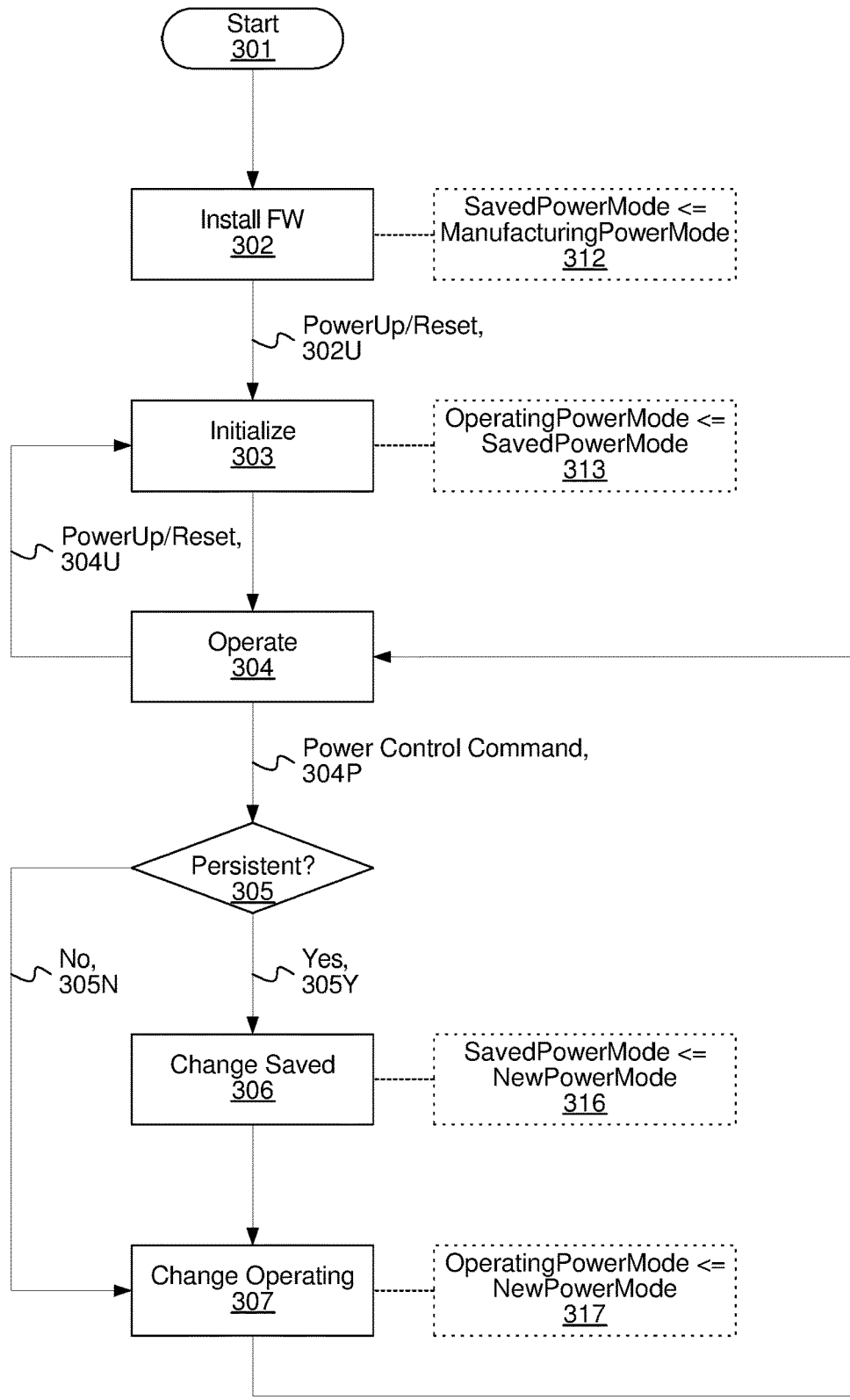
FIG. 3 illustrates selected details of various embodiments of device power control persistence.

FIG. 3 illustrates selected details of various embodiments of device power control persistence. The illustrated actions are performed by a device (e.g. an instance of SSD 101 of FIG. 1B). The actions are variously in response to commands sent by a host (e.g. Host 102 of FIG. 1B), stimuli that is external to the device (e.g. application of power and/or a request for reset), and operation of the device (e.g. processing a command). In summary, a power control command is sent from a host to a device. The power control command is optionally and/or selectively effective until a next power up, until a next reset, and/or until a next power control command.

More specifically, the actions begin (Start 301). In response to a download firmware command, a firmware image is downloaded and made available for execution (Install FW 302). The firmware image includes storage of a saved power mode indicating the power mode that the device is to operate in accordance with subsequent to the next power up and/or reset of the device. Manufacturing of the firmware image includes setting the saved power mode to indicate an initial power mode suitable for first power up and/or reset of the device (SavedPowerMode<= ManufacturingPowerMode 312).

Subsequently, in response to a first power up and/or reset event of the device (PowerUp/Reset 302U), an operating power mode indicator is set to a value (Initialize 303) identical to the saved power mode (OperatingPowerMode<= SavedPowerMode 313). As this is the first power up and/or reset of the device, the saved power mode is a value that was set by the manufacturing, and thus the operating power mode indicator is set to the manufacturing value. The device completes operations performed in response to the power up and/or reset and begins operating in accordance with the operating power mode indicator (Operate 304). For example, if the manufacturing value was "80%", then the device begins operating at 80% of a maximum power budget.

The device continues to operate in accordance with the operating power mode indicator (processing. e.g., read and/or write commands) until a command that affects power control is received by the device (Power Control Command 304P) or a power up and/or reset of the device occurs (PowerUp/Reset 304U). In response to receiving a power control command, the device computes a new power mode and determines if the power control command (and/or one or more optional parameters associated with the power control command) specifies a temporary change to operating power mode or a "permanent" change in the operating power mode (Persistent? 305). A temporary change corresponds to a change that remains in effect until a subsequent power cycle and/or reset of the device. A permanent change corresponds to a change that remains in effect until a subsequent power control command, and "persists" across one or more power cycles and/or resets of the device.

If the change is determined to be permanent (Yes 305Y), then information describing the new operating mode is stored for later reference (Change Saved 306), such as by setting the saved power mode to indicate an appropriate value (SavedPowerMode<=NewPowerMode 316). Flow then proceeds to alter the operating power mode indicator (Change Operating 307) according to the new power mode (OperatingPowerMode<=NewPowerMode 317).

If the change is determined to be temporary (No 305N), then flow proceeds directly to alter the operating power mode indicator (Change Operating 307) according to the new power mode (OperatingPowerMode<= NewPowerMode 317), without altering the saved power mode.

After the altering of the operating power mode indicator (whether in response to a permanent or a temporary change), the flow returns to continue to operate in accordance with the (now changed) operating power mode indicator (Operate 304). As after 303, the device continues to operate in accordance with the operating power mode indicator (processing. e.g., read and/or write commands) until a command that affects power control is received by the device (Power Control Command 304P) or a power up and/or reset of the device occurs (PowerUp/Reset 304U). In response to a power up and/or a reset (PowerUp/Reset 304U), the flow returns to set the operating power mode indicator to a value (Initialize 303) identical to the saved power mode (OperatingPowerMode<=SavedPowerMode 313). If there have been one or more power control commands specifying a permanent change, then the saved power mode has been determined at least in part by the most recent of the power control commands specifying a permanent change, and the operating power mode indicator is set according to the most recent of the power control commands specifying a permanent change. Thus the effect of the most recent of the power control commands specifying a permanent change persists across the power up and/or reset of the device.

In some embodiments, one or more of the power control commands are "absolute", e.g., "set power mode to 80%" or "set power mode to 100%". In some embodiments, one or more of the absolute power control commands are with respect to a maximum. e.g., a maximum power budget for a device or a maximum power dissipation allowable for a device. Thus in response to the absolute power control command "set power mode to 80%", the saved power mode is set to indicate 80% resulting in operation at 80% of a maximum power budget, or alternatively operation at 80% of a maximum power dissipation. In some embodiments one or more of the absolute power control commands are with respect to an average, e.g. an average power budget for a device or an average power dissipation allowable for a device. Thus in response to the absolute power control command "set power mode to 80%", the saved power mode is set to indicate 80% resulting in operation at 80% of an average power budget, or alternatively operation at 80% of an average power dissipation.

In some embodiments, one or more of the power control commands are "relative", e.g., "reduce power mode by 10%" and "set power to 90% of current power". For a first example, a device is operating at 80% of a maximum power budget. Then a relative power control command "reduce power mode by 10%" is received. In response, the saved power mode is set to indicate 70%, resulting in operation at 70% of the maximum power budget. For a second example, the device is operating at 80% of the maximum power budget. Then a relative power control command "set power to 90% of current power" is received. In response, the saved power mode is set to indicate 72%, resulting in operation at 72% of the maximum power budget. For a third example, the device is operating at 90% of the maximum power budget. Then a relative power control command "set power to 1.1 times current power" is received. In response, the saved power mode is set to indicate 99%, resulting in operation at 99% of the maximum power budget.

In some embodiments, a power control command (and/or one or more optional parameters associated with the power control command) specifies a new operating power mode as well as a conceptual "timeline" that the new operating power mode is applicable to. The aforementioned temporary and permanent specifications are examples of the conceptual timeline. Other specifications include any one or more of "persistent across a reset but not a power cycle", "effective at a next power cycle" and "effective at a next reset".

In various embodiments, effecting operation at various power levels is performed by various techniques, such as increasing/reducing concurrent activity and/or frequency. For example, reducing a maximum number of active flash devices reduces power consumption (e.g. reducing how many instances of Flash Device 192 and/or of Flash Die 194 of FIG. 1A are allowed to operate concurrently). For another example, increasing an allowed maximum concurrent activity on one or more device interface buses increases power consumption (e.g. increasing a maximum allowed width of data transmission for Device Interfaces 190 of FIG. 1A). For yet another example, increasing/reducing a frequency of operation of a processing element of the device increases/reduces power consumption (e.g. increasing/reducing an operating and/or output frequency of a PLL and/or a DLL coupled to CPU 171 of FIG. 1A).

In various embodiments, the saved power mode is stored in non-volatile memory, such as illustrated conceptually by Saved Power Mode 196 of FIG. 1B. In various embodiments, the saved power mode and/or a manufacturing value thereof is stored as part of a firmware image, such as illustrated conceptually by Firmware 106 of FIG. 1B. In various embodiments, the saved power mode and/or a representation thereof is stored and/or received from an implementation of a mode page, e.g. a SCSI mode page as implemented by all or any portion of Saved Power Mode 196.

In various embodiments, all or any portions of one or more elements illustrated in FIG. 3 (and/or related to same), correspond to all or any portions of one or more elements illustrated in FIG. 2. For example, 304P of FIG. 3 corresponds to 203H of FIG. 2. For another example, any one or more of 305, 306, 316, 307, and 317 collectively correspond to all or any portions of 204D of FIG. 2.

Figure 4:
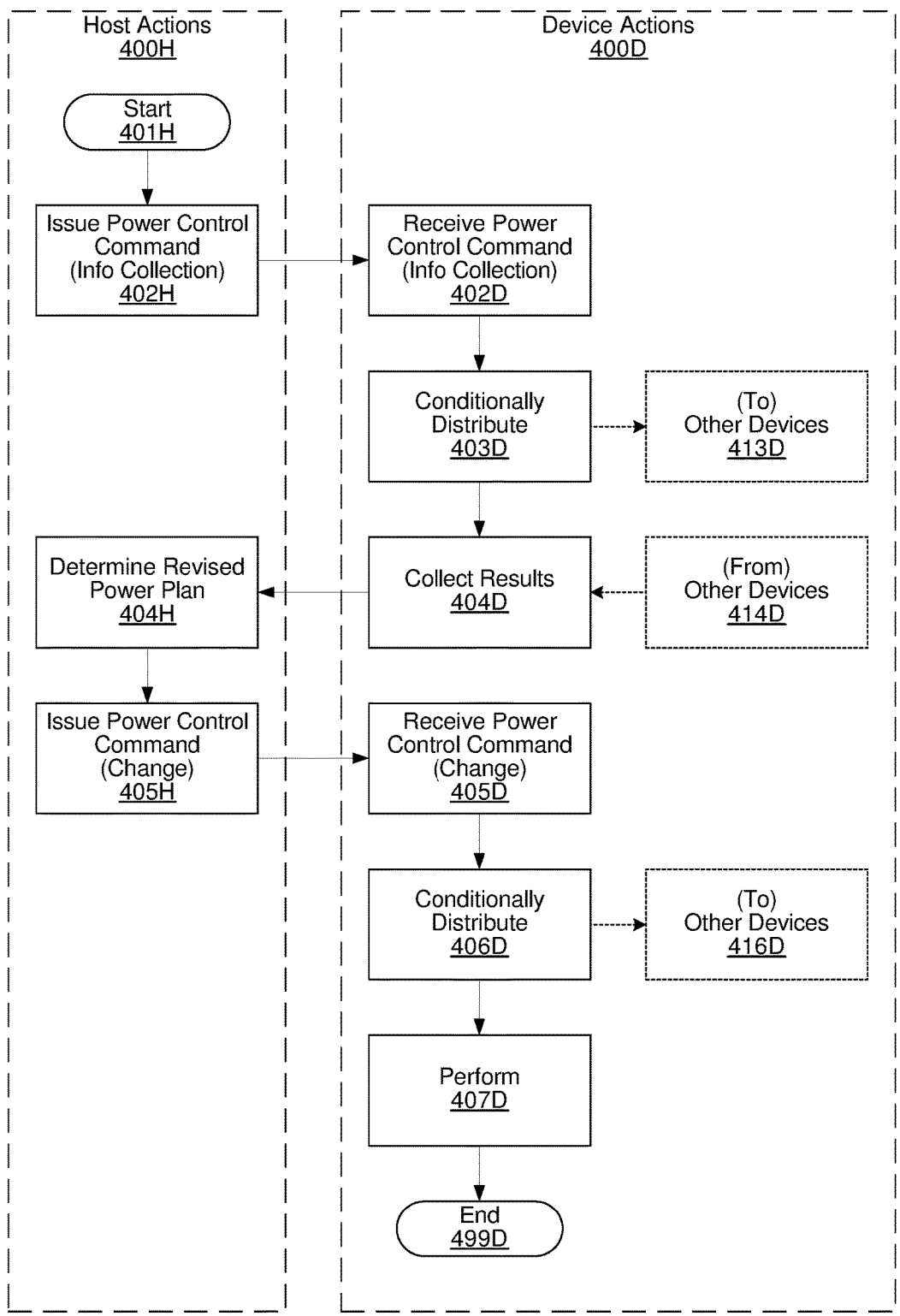
FIG. 4 illustrates selected details of various embodiments of device power control collection and distribution.

FIG. 4 illustrates selected details of various embodiments of device power control collection and distribution. Similar to FIG. 2, the illustrated actions are performed variously by a host (e.g. Host 102 of FIG. 1B) as illustrated by a dashed-box in the left-hand portion of the figure (Host Actions 400H) and a device (e.g. an instance of SSD 101 of FIG. 1B) as illustrated by the dashed-box in the center and right-hand portions of the figure (Device Actions 400D). The host is coupled to and/or in communication with the device (e.g. as illustrated by Intermediate Interfaces 104 and optionally Switch/Fabric/Intermediate Controller 103 of FIG. 1B). In summary, a power control command to obtain power information is sent to a device and distributed by the device to other devices as appropriate. Results of the command are obtained from the device and the other devices as appropriate and returned to the host. The host, at least in part based on the results, optionally and/or selectively semis a power control command to change power to the device. The device then distributes the command to the other devices as appropriate and processes the command itself.

More specifically, the actions begin (Start 401H). A host sends a type of power control command, specifically a power information collection command to collect information relating to power consumption and/or operating temperatures (Issue Power Control Command (Info Collection) 402H). In response, the device accepts the command (Receive Power Control Command (Info Collection) 402D). Then the device determines if the command is to be sent to one or more other devices (Conditionally Distribute 403D), and if so, sends the command to the other devices ((To) Other Devices 413D). For example, if the devices are arranged in a tree and the instant device is a leaf node of the tree, then the instant device performs no distribution. If the instant device is not a leaf node, then the instant device sends the command to any of the other devices coupled to the instant device. Each of the other devices that are sent the command by the instant device performs in accordance with 400D, including sending the command to other devices as appropriate. Thus the command is eventually sent to all of the devices.

Then the (instant) device gathers results of the power information collection command and returns the results to the host (Collect Results 404D). The gathering includes obtaining results from itself, as well as the other devices (if any) that ultimately received the command ((From) Other Devices 414D). For example, if the instant device is the only device (or alternatively is a leaf device of a tree of devices), then the gathering is only of results of the instant device. For another example, if the instant device is a root device of a tree of devices, then the gathering is of results of all of the devices of the tree.

In response to the results, the host determines a new power operating point (Determine Revised Power Plan 404H). The host then sends another type of power control command, specifically a power change control command to modify the power operation of the devices (Issue Power Control Command (Change) 405H). In response, the device accepts the power change control command (Receive Power Control Command (Change) 405D). Then the device determines (as in 403D) if the command is to be sent to the (if any) other devices (Conditionally Distribute 406D), and if so, sends the command to the other devices ((To) Other Devices 416D). Further (as with respect to 403D), the command is eventually sent to all of the devices. Then the (instant) device processes the command itself (Perform 407D). Actions are then complete (End 499D).

In various embodiments, the results are expressed as any one or more of one or more current measurements (e.g. in milliamps), power measurements (e.g. in milliwatts), temperature measurements, and/or approximations thereof. In various embodiments, one or more of the results represent recent information, e.g. obtained in response to the power information collection command, and/or past information. e.g. obtained from a monitoring activity such as stored in a log. In various embodiments, one or more of the results are one or more averages, maxima, and minima over a specific time interval and or one or more specific physical regions. For example, a result is an average of a plurality of sensors on a circuit board of a device, and the average is further averaged over time, e.g. a most recent minute. In some embodiments, a device (at least conceptually) includes a plurality of sub-devices, and the results correspond to one or more averages, maxima, and minima across the sub-devices.

In some embodiments, the host determines the new power operating point (e.g. as in 404H) at least in part with an objective to manage any one or more of current usage, power consumption, and/or temperature.

In various embodiments, all or any portions of one or more elements illustrated in FIG. 4 (and/or related to same), correspond to all or any portions of one or more elements illustrated in FIG. 2 and/or FIG. 3. For example, 402H and/or 405H of FIG. 4 correspond to instances of 203H of FIG. 2. For another example, 402D and/or 4050D of FIG. 4 correspond to instances of 203D of FIG. 2. For yet another example, any one or more of 403D, 413D, 404D, and 414D of FIG. 4 collectively correspond to all or any portions of 204D of FIG. 2. For yet another example, any one or more of 406D, 416D, and 407D of FIG. 4 collectively correspond to all or any portions of 204D of FIG. 2. For yet another example, 407D of FIG. 4 corresponds to any one or more of all or any portions of 305, 306, 316, 307, and 317 of FIG. 3.

Figure 5:
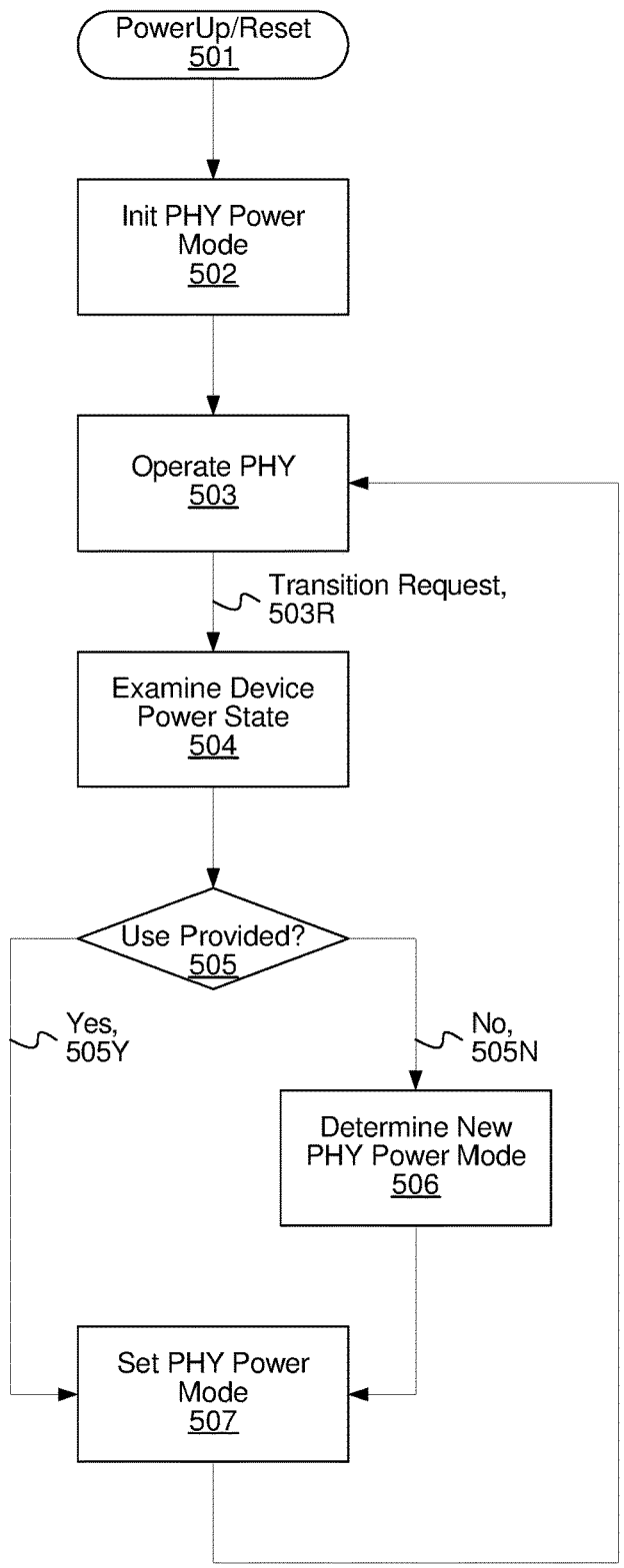
FIG. 5 illustrates selected details of various embodiments of device power control of an interface.

FIG. 5 illustrates selected details of various embodiments of device power control of an interface. The illustrated actions are performed by an interface (e.g. of a device and for communication with a host) and/or one or more elements controlling and/or managing the interface (such as Host Interfaces 111 of FIG. 1A).

In summary, the interface is a portion of a device and is a physical interface such as a PHY interface optionally and/or selectively compatible with one or more storage interface standards. While operating in a compatible mode, the PHY interface is fully compliant with a particular storage interface standard (e.g. a SATA interface standard). While operating in an enhanced mode, the PHY interface is fully compliant with the particular storage interface standard except with regards to processing requests to transition operation to a specific power mode. While operating in the enhanced mode, the requests are processed conditionally and/or selectively dependent on a power state of the device, and a request to transition to a particular power mode conditionally and/or selectively results in operation in the particular power mode, another power mode that is different than the particular power mode, or continued operation in a current power mode.

More specifically, action begins in response to powering up and/or resetting the interface (PowerUp/Reset 501). The interface then initializes, including setting a beginning operating power mode for the interface (Initialize PHY Power Mode 502). Subsequently the interface operates in accordance with the beginning operating power mode (Operate PHY 503). The interface continues to operate in accordance with the beginning operating power mode until receipt of a request to change to a specific power mode (Transition Request 503R). The request is received via the interface, such as from a host coupled to the device via the interface (e.g. from Host 102 of FIG. 1B to SSD Controller 100 via Host Interfaces 111 of FIG. 1A).

Then the device consults information concerning current operating power state of the device (Examine Device Power State 504). The information concerning the current operating power state of the device includes any one or more of whether increased power (e.g. to enable decreased latency) is a current objective, whether decreased power (e.g. at an expense of increased latency) is a current objective, and other information relating to, e.g., power and/or performance objectives. Then the device determines whether to transition to the specified power mode, e.g. to use the specified power mode as a new operating power mode (Use Provided? 505). If the device determines to use the specified power mode (Yes 505Y), then the device proceeds to set the specified power mode as the (new specified) operating power mode (Set PHY Power Mode 507). If the device determines not to use the specified power mode (No 505N), then the device proceeds to compute a new operating power mode (Determine New PHY Power Mode 506), based at least in part on the specified power mode and the information concerning the current operating power state. In some scenarios, the new (computed) operating power mole is identical to a current operating power node (e.g. there is no transition of operating power mode). Then the device proceeds to set the specified power mode as the new (computed) operating power mode (Set PHY Power Mode 507). The flow then returns back (503) to continue operating the interface in accordance with the new (either specified or computed) operating power mode (until receipt of another request to change to a specific power mode).

FIG. 5 and the associated description are applicable to the interface operating in the enhanced mode. Operation in the compatible mode is similar, except that 504 is optionally omitted. 506 and 506 are omitted, and flow proceeds along 505Y unconditionally (e.g. flow proceeds directly from 503 or 504 to 507). As set forth. FIG. 5 and the associated description are applicable to a context of an interface of a device. In various embodiments and/or usage scenarios, FIG. 5 and the associated description are applicable to an interface of a host (e.g. information concerning a current host operating power state is consulted instead of information concerning a current device operating power state).

Following is a detailed description of an exemplary embodiment of device power control of an interface. A storage device (e.g. a SAS and/or a SATA compatible storage device) and/or a host include a PHY implementing three power modes; active, partial, and slumber. The partial power mode has faster wake up time than the slumber power mode, e.g., a transition from the partial power mode to the active power mode is 2 uS, and a transition from the slumber power mode to the active power mode is 50 uS. In an operating scenario where a host is coupled to a storage device via a link, power mode transition request primitives exchanged on the link request transitions to the partial and slumber power modes, such as partial-power-mode-request and slumber-power-power-mode-request primitives (e.g. respectively primitives PMREQ_P and PMREQ_S for SAS and/or SATA). In various operating scenarios (e.g. while operating in the compatible mode), the host and/or the storage device initiate sending the primitives, and in response PHYs of the host and the storage device transition to the partial or slumber power mode, as indicated by the primitive. PHY slumber mode is a lower-power mode than PHY partial power mode.

In some situations (e.g. while operating in the compatible mode), the PHY power mode is negotiated via one or more low level state machines, operating based on an amount of activity on the link, without overall system context. For example, if there is less than a first threshold of activity on the link, then a partial-power-mode-request primitive is sent. Continuing with the example, if there is less than a second threshold of activity on the link, the second threshold being less than the first threshold, then a slumber-power-mode-request primitive is sent. In some situations, however, a system including a host and a storage device is in an overall system context such that a relatively high performance (e.g. relatively low latency) to wake up is advantageous (at an expense of power), even though there is relatively less activity on a link, or alternatively relatively high power savings are advantageous (at an expense of latency), even though there is relatively more activity on a link. Thus the state machines, in some instances, negotiate a slumber power mode when a relatively low latency would be advantageous, or alternatively negotiate a partial power mode when relatively low power (e.g. relatively high power savings) would be advantageous.

In some embodiments and/or usage scenarios (e.g. while operating in the enhanced mode), the PHYs of the host and/or the storage device selectively transition power modes based on other information in addition to power mode transition request primitives. The other information includes information concerning current operating power state, such as storage device power state information, usable to determine, for example, if latency or power savings is to be optimized. For example, in response to a slumber-power-mode-request primitive exchange, a storage device examines storage device power state information, and determines that instead of transitioning to the slumber power mode, latency is to be optimized, and the storage device transitions to the partial power mode. For another example, in response to a partial-power-mode-request primitive exchange, a storage device examines storage device power state information, and determines that instead of transitioning to the partial power mode, power saving is to be optimized, and the storage device transitions to the slumber power mode.

Therefore rather than statically mapping an exchanged power mode transition request primitive directly into a PHY power mode transition (e.g. while operating in the compatible mode), storage device power state information is examined to determine the PHY power mode transition (e.g. while operating in the enhanced mode). Thus a partial-power-mode-request primitive is dynamically and/or selectively mapped, based on storage device power state information, to either a partial power mode or a slumber power mode. Similarly, a slumber-power-mode-request primitive is dynamically and/or selectively mapped, based on storage device power state information, to either a partial power mode or a slumber power mode. The dynamically and/or selectively mapping of the power mode transition request primitives enables a system to be selectively optimized for performance or power.

Figure 6:
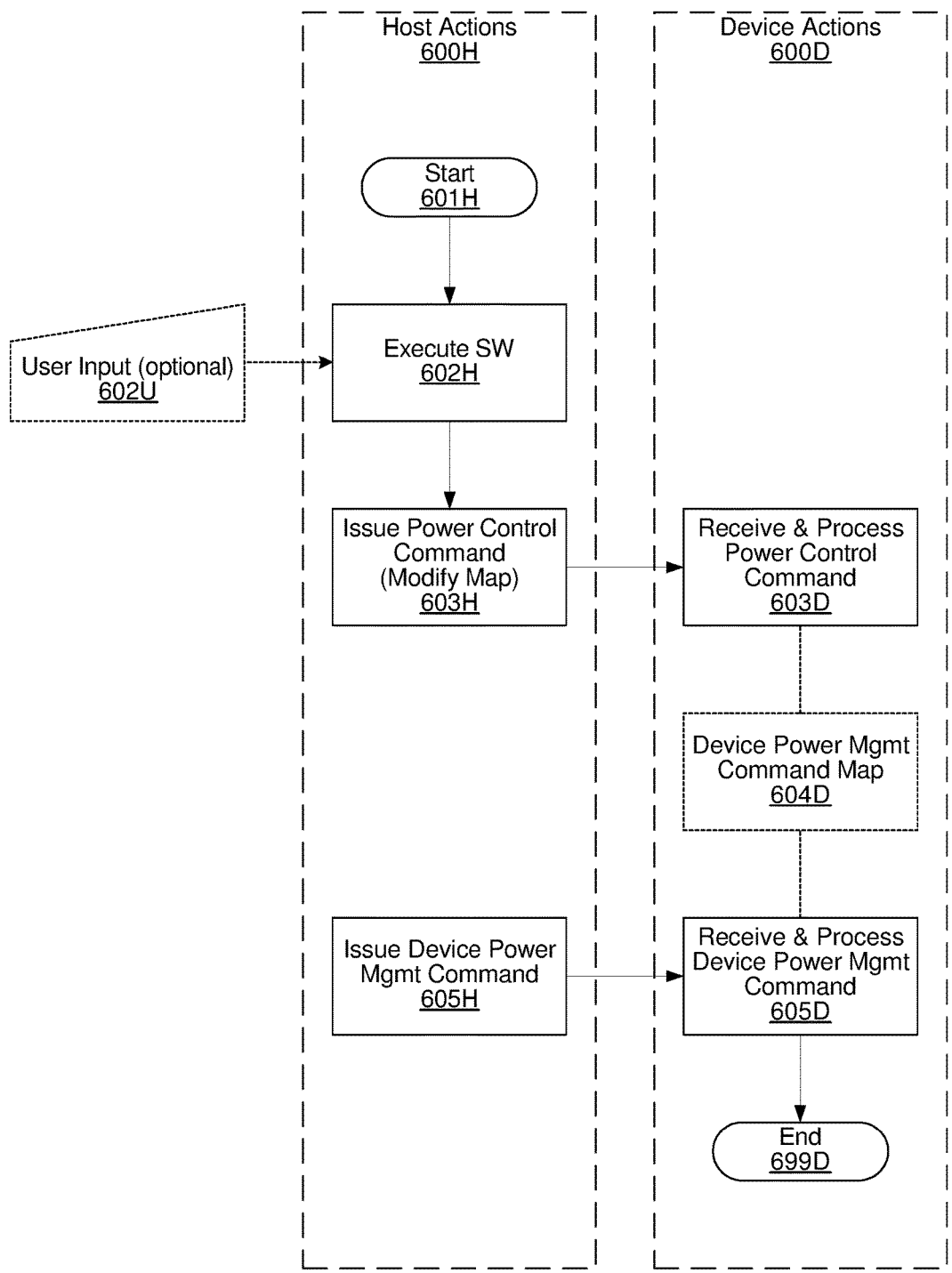
FIG. 6 illustrates selected details of various embodiments of device power control with respect to device power management commands.

FIG. 6 illustrates selected details of various embodiments of device power control with respect to device power management commands. Similar to FIGS. 2 and 4, the illustrated actions are performed variously by a host (e.g. Host 102 of FIG. 1B) as illustrated by a dashed-box in the center portion of the figure (Host Actions 600H) and a device (e.g. an instance of SSD 101 of FIG. 1B) as illustrated by the dashed-box in the right-hand portion of the figure (Device Actions 600D). The host is coupled to and/or in communication with the device (e.g. as illustrated by Intermediate Interfaces 104 and optionally Switch/Fabric/Intermediate Controller 103 of FIG. 1B). In summary, a device is enabled to consult a device power management command map to determine which of a plurality of operating power states to operate in accordance with in response to reception of a device power management command. A host runs software (optionally with user input) to send a power control command that specifies one or more modifications to the device power management command map. Subsequently received device power management commands are interpreted in accordance with the modifications. Thus mapping between device power management commands and operating power states of the device is selectively and/or dynamically maintained.

More specifically, the actions begin (Start 601H). A host runs one or more programs (Execute Software 602H), such as one or more power control software modules (e.g. all or any portions of Power Control Software 108 of FIG. 1B. A user optionally initiates and/or optionally provides input to the programs (User Input (optional) 602U), such as via entry of one or more command strings and/or parameters. In response, the Software sends a power control command to the device (Issue Power Control Command (Modify Map) 603H). The power control command specifies one or more modifications to a map (Device Power Management Command Map 604D) that is used to translate device power management commands to respective device operating power states. The device then accepts and processes the power control command (Receive & Process Power Control Command 603D), including altering Device Power Management Command Map 604D as specified by the command.

Subsequently, the host sends a device power management command to the device (Issue Device Power Management Command 605H). In response, the device accepts and processes the power management command (Receive & Process Device Power Management Command 605D), including consulting Device Power Management Command Map 604D to determine which of a plurality of operating power states to subsequently operate the device in accordance with. Then the device proceeds to operate in accordance with the determined operating power state. Actions are then complete (End 699D).

In various embodiments, the device power management command is issued in response to execution of one or more programs or portions thereof on the host. For example, a device driver (e.g. Driver 107 of FIG. 1B) determines, such as due to inactivity and/or temperature overage, that power is to be reduced, and issues a device power management command to reduce power. For another example, an OS (e.g. OS 105 of FIG. 1B) or portion thereof determines, such as due to expected performance requirements, that performance is to be increased (or at least allowed to increase), and issues a device power management command to increase performance (e.g. to exit a lower power and hence lower performance state).

In various embodiments and/or usage scenarios the map-modifying power control command is optionally and/or selectively a queued command or is optionally and/or selectively not a queued command. In various embodiments, all or any portions of Device Power Management Command Map 604D correspond to all or any portions of the information concerning the current operating power state (e.g. as consulted with respect to 504 of FIG. 5).

The following table describes a plurality of example mappings between particular device power management commands (e.g. selected SATA commands) and corresponding device operating power states (e.g. selected SATA power states), such as indicated by information maintained in Device Power Management Command Map 604D.

| Device Power Management Command | Device Operating Power State | | |
| --- | --- | --- | --- |
| | Default | Low Power | High Performance |
| N/A | Active | Low Power | High Performance |
| IDLE | Idle | Sleep | High Performance |
| STANDBY | Standby | Sleep | High Performance |
| SLEEP | Sleep | Sleep | High Performance |

The column labeled "Default" represents mappings resulting from, e.g., a (map-modifying) power control command such as "set default device power management command mappings". After receipt and processing of the "set default device power management command mappings" power control command. Device Power Management Command Map 604D is modified so that device power management commands are mapped to similarly named device operating power states (IDLE→Idle, STANDBY→Standby, and SLEEP→Sleep). The column labeled "Low Power" represents mappings resulting from, e.g., a (map-modifying) power control command such as "set low power device power management command mappings". After receipt and processing of the "set low power device power management command mappings" power control command, Device Power Management Command Map 604D is modified so that all of the device power management commands (IDLE. STANDBY, and SLEEP) are mapped to the lowest device operating power state (Sleep). The column labeled "High Performance" represents mappings resulting from, e.g., a (map-modifying) power control command such as "set high performance device power management command mappings". After receipt and processing of the "set high performance device power management command mappings" power control command. Device Power Management Command Map 604D is modified so that all of the device power management commands (IDLE, STANDBY, and SLEEP) are mapped to the highest device operating power state (High Performance).

Following is a detailed description of various exemplary embodiments of device power control with respect to device power management commands.

In a first of the various exemplary embodiments, a storage device (e.g. a SATA compatible drive) is coupled to a host (e.g. a desktop computer). A user executes an application program on the desktop computer to alter how the drive interprets device power management commands. e.g. by sending a "set high performance device power management command mappings" power control command to the drive. Afterward the drive maps all device power management commands to a high performance device operating state, thus enabling high performance.

Subsequently the user uncouples the drive from the desktop computer and couples it to a laptop computer. The user executes the application (or a variant thereof) on the laptop computer to again alter how the drive interprets device power management commands. e.g. by sending a "set low power device power management command mappings" power control command to the drive. Afterward the drive maps all device power management commands to a sleep device operating state, thus enabling low power consumption. Then the user plugs the laptop computer into a wall outlet and executes the application to send a "set high performance device power management command mappings" power control command to the drive. In response the drive maps all device power management commands to a high performance device operating state, thus enabling high performance. The user then performs one or more activities using the laptop computer (e.g. playing games). When the user finishes the activities, the user executes the application to send a "set low power device power management command mappings" power control command to the drive, enabling subsequent low power consumption operation of the drive.

In a second of the various exemplary embodiments, a storage device (e.g. a SATA compatible drive) is coupled to a host (e.g. a laptop computer). Software executing on the laptop computer (e.g. an application, a driver, and/or one or more portions of an OS) detects changes in how the laptop is powered (e.g. outlet-powered or battery-powered). Upon detecting that the laptop computer is outlet-powered, the software sends a "set high performance device power management command mappings" command to the drive, resulting in all device power management commands being mapped to a high performance device operating state, thus enabling high performance operation of the drive. Upon detecting that the laptop computer is battery-powered, the software sends a "set low power device power management command mappings" command to the drive, resulting in all device power management commands being mapped to a sleep device operating state, thus enabling low power consumption operation of the drive. Therefore the behavior of the drive in response to the device power management commands is dynamically altered depending on an operating power context (outlet-powered versus battery-powered).

In a third of the various exemplary embodiments, a storage device (e.g. a SATA compatible drive) is coupled to a host (e.g. a desktop or laptop computer). Software executing on the laptop computer (e.g. an application, a driver, and/or one or more portions of BIOS and/or an OS) dynamically configures the drive to operate within a specified power budget (e.g. envelope) based on system power and/or system performance goals and/or objectives. For instance, when playing a game and outlet-powered, the drive is configured for maximum performance. When running an application (e.g. not benefiting from high performance) and battery-powered, the drive is configured for minimum power consumption.

In various embodiments, all or any portions of device actions illustrated in any one or more of FIGS. 2-6 are performed wholly or in part by any one or more of execution of one or more firmware modules, by operation of one or more state machines, and/or by one or more hardware logic modules. For example, the operating power mode indicator is maintained by execution of one or more portions of a firmware image (e.g. CPU 171 of FIG. 1A executing one or more portions of an instance of FW 106 of FIG. 1B) such as by altering a value stored in volatile or non-volatile memory (e.g. SPM 196 of FIG. 1B). For another example, Power Control of FIG. 1A implements one or more portions of one or more device actions illustrated in any one or more of FIGS. 2-6. For yet another example, the information concerning the current operating power state of the device is maintained at least in part by execution of one or more portions of a firmware image (e.g. CPU 171 of FIG. 1A executing one or more portions of an instance of FW 106 of FIG. 1B). For yet another example, a device power management command map (e.g. Device Power Management Command Map 604D of FIG. 6) is maintained at least in part by execution of one or more portions of a firmware image (e.g. CPU 171 of FIG. 1A executing one or more portions of an instance of FW 106 of FIG. 1B) such as by altering a value stored in volatile or non-volatile memory (e.g. a portion of NVM 199 of FIG. 1B).

Example Implementation Techniques

In some embodiments, various combinations of all or any portions of operations performed by a system, host, device, device controller, storage device, storage device controller, SSD, or SSD controller enabled to operate in accordance with device power control, a computing-host flash memory controller, and/or an SSD controller (such as SSD Contoller 100 of FIG. 1A), and portions of a processor, microprocessor, system-on-a-chip, application-specific-integrated-circuit, hardware accelerator, or other circuitry providing all or portions of the aforementioned operations, are specified by a specification compatible with processing by a computer system. The specification is in accordance with various descriptions, such as hardware description languages, circuit descriptions, netlist descriptions, mask descriptions, or layout descriptions. Example descriptions include: Verilog, VHDL, SPICE, SPICE variants such as PSpice, IBIS, LEF, DEF, GDS-II, OASIS, or other descriptions. In various embodiments, the processing includes any combination of interpretation, compilation, simulation, and synthesis to produce, to verify, or to specify logic and/or circuitry suitable for inclusion on one or more integrated circuits. Each integrated circuit, according to various embodiments, is designable and/or manufacturable according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

In some embodiments, various combinations of all or portions of operations as described by a computer readable medium having a set of instructions stored therein, are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with any standard programming or scripting language (such as C, C++, Fortran, Pascal, Ada, Java, VBscript, and Shell). One or more of the program instructions, the language statements, or the binary instructions, are optionally stored on one or more computer readable storage medium elements. In various embodiments, some, all, or various portions of the program instructions are realized as one or more functions, routines, sub-routines, in-line routines, procedures, macros, or portions thereof.

CONCLUSION

Certain choices have been made in the description merely for convenience in preparing the text and drawings, and unless there is an indication to the contrary, the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "comprises", "comprising", "includes", and "including" are specifically intended to be construed as abstractions describing logical sets of open-ended (non-restrictive) scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued parent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as flash memory technology types; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof. It is also understood that many functional aspects of embodiments are realizable selectively in either hardware (e.g., generally dedicated circuitry) or software (e.g., via some manner of programmed controller or processor, as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:
1. A method comprising:
   while operating a device in accordance with a current operating power state, receiving a power control command from a host connected to the device;

in response to receiving the power control command, dynamically modifying mapping information in the device based on the power control command, the mapping information comprising mappings between device power management commands and device operating power states;

receiving a device power management command to transition the operation of the device to a specified operating power state;

based on the specified operating power state in the device power management command and the mapping information, determining a new operating power state for the device; and operating the device in accordance with the new operating power state, wherein the new operating power state is different than the specified operating power state.

2. The method of claim 1, wherein the specified operating power state is a higher-power state than the current operating power state, and the new operating power state is identical to the current operating power state.

3. The method of claim 2, wherein the power control command prioritizes decreased power over increased performance.

4. The method of claim 1, wherein the device power management commands comprising the mapping information comprise one or more of an IDLE command, a STANDBY command, and a SLEEP command.

5. The method of claim 1, wherein the device operating power states comprising the mapping information comprise one or more of a High Performance power state, an Active power state, a Low Power power state, an Idle power state, a Standby power state, and a Sleep power state.

6. The method of claim 1, wherein the device power management command is a second command, the method further comprising:

receiving at the device, before the receiving of the second command, a first command; and commencing by the device processing of the second command while the first command is outstanding.

7. A non-transitory tangible computer readable medium having a set of instructions stored therein that when executed by a processing element cause the processing element to perform and/or control operations comprising:

while operating a device in accordance with a current operating power state, receiving a power control command from a host connected to the device;

in response to receiving the power control command, dynamically modifying mapping information in the device based on the power control command, the mapping information comprising mappings between device power management commands and device operating power states;

receiving a device power management command to transition the operation of the device to a specified operating power state;

based on the specified operating power state in the device power management command and the mapping information, determining a new operating power state for the device; and operating the device in accordance with the new operating power state.

8. The non-transitory tangible computer readable medium of claim 7, wherein the specified operating power state is a higher-power state than the current operating power state, and the new operating power state is identical to the current operating power state.

9. The non-transitory tangible computer readable medium of claim 8, wherein the power control command prioritizes decreased power over increased performance.

10. The non-transitory tangible computer readable medium of claim 7, wherein the device power management commands comprising the mapping information comprise one or more of an IDLE command, a STANDBY command, and a SLEEP command.

11. The non-transitory tangible computer readable medium of claim 7, wherein the device operating power states comprising the mapping information comprise one or more of a High Performance power state, an Active power state, a Low Power power state, an Idle power state, a Standby power state, and a Sleep power state.

12. The non-transitory tangible computer readable medium of claim 7, wherein the device power management command is a second command, the non-transitory tangible computer readable medium having further instructions stored therein that cause the processing element to perform and/or control operations comprising:

receiving, before the receiving of the second command, a first command; and commencing processing of the second command while the first command is outstanding.

13. A storage device comprising:

logic circuitry enabled, while operating the storage device in accordance with a current operating power state, to receive a power control command from a host connected to the storage device;

logic circuitry enabled, in response to receiving the power control command, dynamically modify a device power management command map in the storage device based on the power control command, the device power management command map comprising mappings between device power management commands and device operating power states;

logic circuitry enabled to receive a device power management command to transition the operation of the storage device to a specified operating power state;

logic circuitry enabled, based on the specified operating power state in the device power management command and the device power management command map, to determine a new operating power state for the storage device; and logic circuitry enabled to operate the storage device in accordance with the new operating power state.

14. The storage device of claim 13, wherein the specified operating power state is a higher-power state than the current operating power state, and the new operating power state is identical to the current operating power state.

15. The storage device of claim 14, wherein the power control command prioritizes decreased power over increased performance.

16. The storage device of claim 13, wherein the device power management commands comprising the device power management command map comprise one or more of an IDLE command, a STANDBY command, and a SLEEP command.

17. The storage device of claim 13, wherein the device operating power states comprising the device power management command map comprise one or more of a High Performance power state, an Active power state, a Low Power power state, an Idle power state, a Standby power state, and a Sleep power state.

18. The storage device of claim 13, wherein the device power management command is a second command, the storage device further comprising:

logic circuitry enabled to receive, before the receiving of the second command, a first command; and logic circuitry enabled to commence processing of the second command while the first command is outstanding.

\* \* \* \* \*